(12) United States Patent
Mamiya et al.

(10) Patent No.: US 6,244,241 B1
(45) Date of Patent: Jun. 12, 2001

(54) FUEL INJECTION CONTROL SYSTEM FOR DIRECT INJECTION-SPARK IGNITION ENGINE

(75) Inventors: Kiyotaka Mamiya, Higashihiroshima; Michihiro Imada, Hiroshima; Takeo Yamauchi, Hatsukaichi; Masayuki Tetsuno, Hiroshima, all of (JP)

(73) Assignee: Mazada Motor Corporation, Hiroshima (JP)

( * ) Notice: Subject to any disclaimer, the term of this patent is extended or adjusted under 35 U.S.C. 154(b) by 0 days.

(21) Appl. No.: 09/281,318

(22) Filed: Mar. 30, 1999

(30) Foreign Application Priority Data

Mar. 31, 1998 (JP) .................................................. 10-087663
Feb. 18, 1999 (JP) .................................................. 11-040648

(51) Int. Cl.$^7$ .............................. F02D 41/16; F02D 41/40
(52) U.S. Cl. ............................................. 123/295; 123/299
(58) Field of Search ............................... 123/295, 299, 123/300, 673, 674, 675

(56) References Cited

U.S. PATENT DOCUMENTS

| | | | |
|---|---|---|---|
| 4,962,741 | * 10/1990 | Cook et al. | 123/673 |
| 5,904,128 | * 5/1999 | Shimada et al. | 123/295 |
| 5,954,023 | * 9/1999 | Mizuno et al. | 123/299 |
| 5,979,397 | * 11/1999 | Machida et al. | 123/295 |

FOREIGN PATENT DOCUMENTS 5-214999     8/1993  (JP) .

* cited by examiner

*Primary Examiner*—Andrew M. Dolinar
(74) *Attorney, Agent, or Firm*—Nixon Peabody, LLP; Donald R. Studebaker

(57) ABSTRACT

A fuel injection control system for a direct injection-spark ignition engine determines an injection pulse width corresponding to a given quantity of fuel with which an injector is kept open, controls the injector to spray a given quantity of fuel in a compression stroke while the engine operates in a zone of lower engine loads specified for lean stratified charge combustion so that the fuel is stratified around an ignition plug to cause lean stratified charge combustion so as thereby to provide an air-fuel ratio greater than a stoichiometric air-fuel ratio, executes fuel injection feedback control to control a quantity of fuel injection based on an air-fuel ratio detected by an oxygen sensor, causes the injector to spray a given quantity of fuel through a plurality of intake stroke split injection in a specified engine operating zone in which the fuel injection feedback control is performed to maintain at least a stoichiometric air-fuel ratio while the engine operates with lower loads, learns a fuel injection quantity characteristic of the injector with respect to injection pulse width for each intake stroke split injection based on a value controlled by the fuel injection feedback control during execution of the intake stroke split injection to determine a leaning correction value, and makes the learning correction value reflect on the control of the quantity of fuel in a minute injection zone specified within the specified engine operating zone for the lean stratified charge combustion.

15 Claims, 19 Drawing Sheets

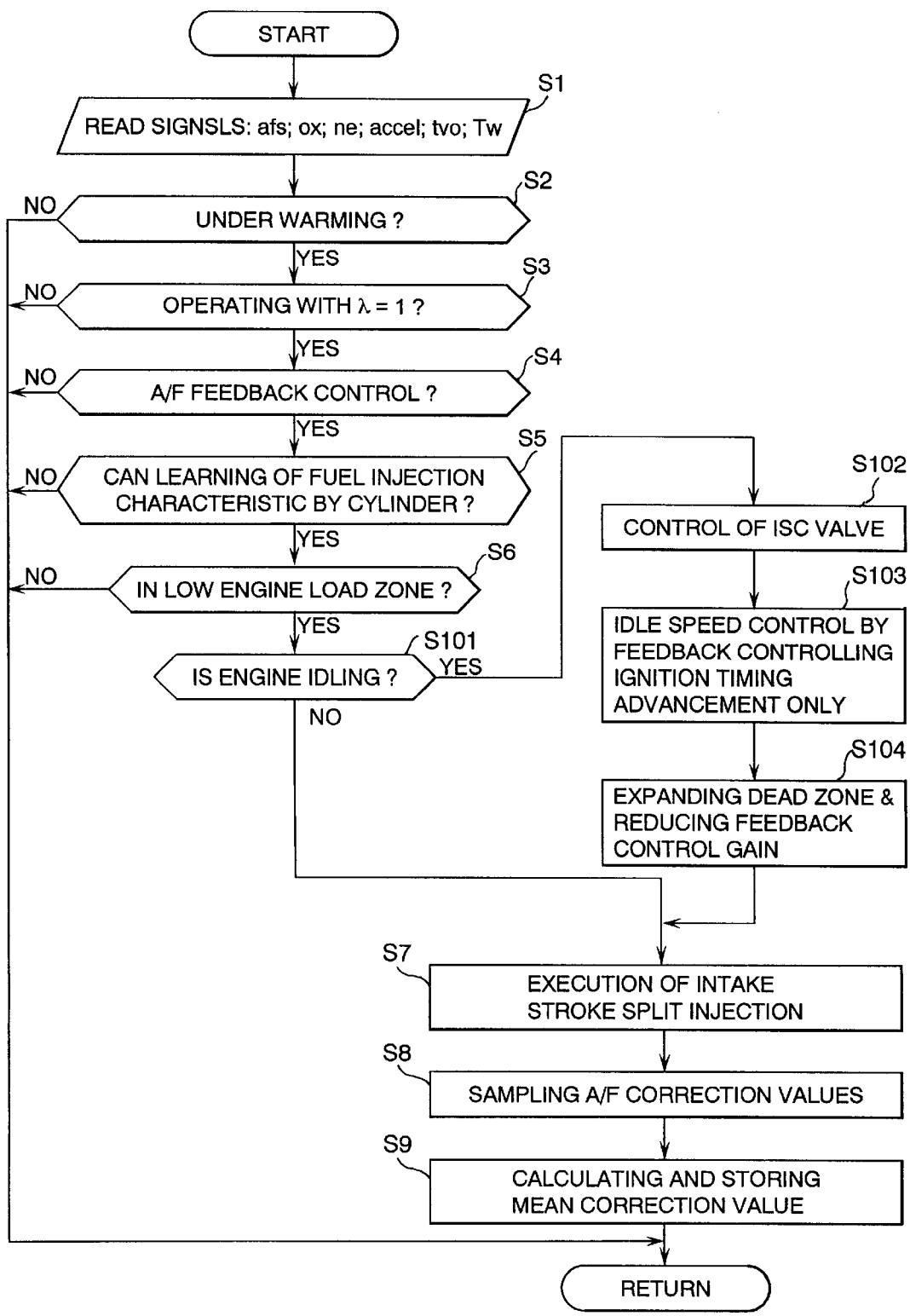

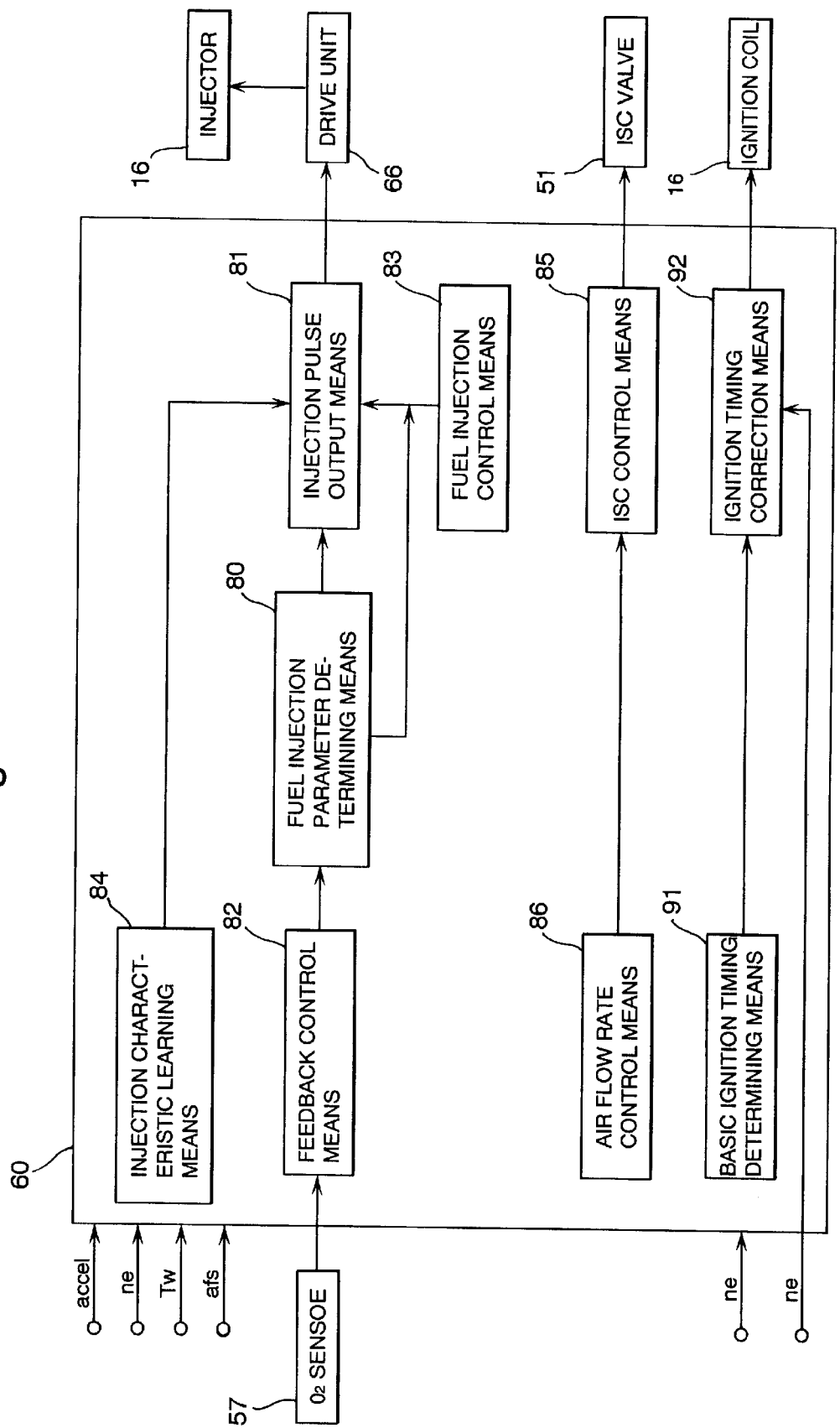

FUEL INJECTION CONTROL SYSTEM FOR DIRECT INJECTION-SPARK IGNITION ENGINE

BACKGROUND OF THE INVENTION

1. Field of the Invention

The invention relates to a fuel injection control system and, in particular, to a fuel injection control system for a direct injection-spark ignition engine which learns a fuel injection quantity characteristic of an injector with respect to an injection pulse width.

2. Description of Related Art

Typically, direct injection-spark ignition engines are operative to perform stratified charge combustion by spraying fuel in a compression stroke in a specified engine operating zone, such as a lower engine load and speed zone, with the effect of improving fuel consumption. Such a direct injection-spark ignition engine is equipped with a fuel injector which is pulsed by an electronically controlled fuel injection system (which is hereafter referred to as a fuel injection system for simplicity) to open. The fuel injection system determines an injection pulse width upon which the quantity of fuel delivered by a given injector depends and an injection timing at which the injector is caused to open. The injector is operative to spray fuel according to a given fuel injection quantity characteristic with respect to injection pulse width. In order to eliminate differences in fuel injection quantity characteristics of the individual injectors, the fuel injection quantity characteristic of a given injector is modified or corrected by changing a conversion factor between fuel injection quantity and injection pulse width. Specifically, a fuel injection quantity characteristic between fuel injection quantity and pulse width, shown by means of example in FIG. 12, is different in proportional relationship between the major part (normal injection characteristic zone) A and a minute injection characteristic zone B. This results from an increase in the ratio of time spent on injector valve movement to time for which the injector remains open in the minute injection zone B. Further, shown by means of example in FIG. 13, variation in fuel injection quantity characteristic due to differences of the individual injectors becomes greater with a decrease in the quantity of fuel injection. Accordingly, there is not only a change in the given fuel injection quantity characteristic between the normal injection zone A and the minute injection zone B but also a greater variation in fuel injection quantity characteristic among the individual injectors in the minute injection zone B as compared with the normal injection zone A. In particular, since the direct injection-spark ignition engine often experiences cases where a quantity of fuel required according to a given engine operating condition must be sprayed within a considerably short period of time, it is necessary to equip the engine with injectors with a relatively large ratio of injection (a ratio of a quantity of fuel injection to an open time). However, such an injector is hard to be given a minute injection zone B. In addition, since the direct injection-spark ignition engine increases its combustion efficiency when stratified charge combustion is made by spraying fuel in a compression stroke to raise an air-fuel ratio and the quantity of fuel injection is reduced in consequence, the quantity of fuel injection is reduced to an extent which falls into the minute injection zone B during engine operation with lower engine load, such as during idling. Therefore, in these circumstances, when translating the quantity of fuel injection into an injection pulse using only a conversion factor specified according to the fuel injection quantity characteristic for the normal injection zone A, there occurs a determination of accuracy of the control of fuel injection quantity.

In order to prevent such a determination of accuracy of the control of fuel injection quantity, a fuel injection device for a multi-cylinder internal combustion engine has been proposed in, for example, Japanese Unexamined Patent Publication No. 5-214999 that publication differentiates between a conversion factor for a surge operating zone (which corresponds to the minute injection zone B) and a proportional zone in which the quantity of fuel injection is proportional to a period of time for which the injector remains open (which corresponds to the normal injection zone A) and corrects the conversion factor used in the surge operating zone so as to make output torque equal among cylinders.

While the prior art fuel injection device is designed and adapted to regulate relative variation in output torque among the respective cylinders by correcting the conversion factor so as to make output torque equal among cylinders in the surge operating zone, an error in the absolute quantity of fuel injection is not always eliminated. Further, any such correction of the conversion factor has to be made under such engine operating conditions that the quantity of fuel injection falls within the minute injection zone B, in which a demand for stratified charge combustion by compression stroke injection is made. However, since even a slight aberration of ignition timing causes a great change in cylinder pressure or in difference between cylinder pressure and fuel pressure, which affects the quantity of fuel injection, it is hard to make an accurate correction of the conversion factor.

The conversion factor may be determined and corrected according to fluctuations in fuel injection feedback correction value while the engine operates in an engine operating state in which fuel injection feedback control is accomplished according to an output representative of the air-fuel ratio from an oxygen ($O_2$) sensor to maintain a stoichiometric air-fuel ratio. Since thermal efficiency is inferior in an engine operating state in which the engine operates in a stoichiometric air-fuel ratio as compared with an engine operating state in which the engine performs lean stratified charge combustion, the quantity of fuel injection for a given engine output torque is larger during the engine operation in the stoichiometric air-fuel ratio than during the engine operation with the lean stratified charge combustion. Therefore, a fuel injection quantity zone (marked "a" in FIG. 12) in which the determining and correcting of a conversion factor is accomplished is differentiated from a fuel injection quantity zone (marked "b" in FIG. 12) in the minute injection zone B for engine operation with stratified charge combustion, which results in an inaccurate correction of conversion factor.

SUMMARY OF THE INVENTION

It is therefore an object of the invention to provide a fuel injection control system for a direct injection-spark ignition engine which can accomplish an accurate correspondence of fuel injection quantity to injection pulse width in a minute injection zone B for an engine operating state in which the engine performs stratified charge combustion with lower engine loads and accurately determine and correct a conversion factor according to the variation in the correspondence of fuel injection quantity to injection pulse.

The foregoing object of the invention is accomplished by a fuel injection control system, for a direct injection-spark ignition engine equipped with an injector operative to spray fuel directly into a combustion chamber of the engine, which determines an injection pulse width corresponding to a quantity of fuel with which the injector is kept open to spray the quantity of fuel, and controls the injector to spray fuel through a compression stroke while the engine operates with a lower engine load in an engine operating zone specified for lean stratified charge combustion so that the fuel is stratified around an ignition plug to cause lean stratified charge combustion to, thereby provide an air-fuel ratio greater than a stoichiometric air-fuel ratio. The fuel injection control system accomplishes fuel injection feedback control to control the quantity of fuel injection based on the air-fuel ratio detected by an oxygen sensor, causes the injector to spray fuel through a plurality of intake stroke split injection in a specified engine operating zone in which the fuel injection feedback control is performed to maintain at least an approximately stoichiometric air-fuel ratio while the engine operates with lower engine loads, determines a fuel injection quantity characteristic of the injector with respect to injection pulse width for each intake stroke split injection based on a value controlled by the fuel injection feedback control during execution of the intake stroke split injection to determine a correction value, and makes the correction value reflect on the control of the quantity of fuel injection in a minute injection quantity zone specified within the specified engine operating zone for a lean stratified charge combustion state.

According to the fuel injection control system, while fuel injection feedback control is accomplished to maintain an approximately stoichiometric air-fuel ratio, [the learning of] a fuel injection quantity characteristic to cancel variation in fuel injection quantity characteristic of the injector is determined. Thermal efficiency is inferior in an engine operating state in which the engine operates in a stoichiometric air-fuel ratio as compared with an engine operating state in which the engine performs lean stratified charge combustion as a consequence, the quantity of fuel injection for given engine output torque becomes larger during the engine operation in the stoichiometric airfuel ratio than during the engine operation with the lean stratified charge combustion. Fuel injection is split in an intake stroke, so that the quantity of fuel injection corresponding to a fuel injection pulse width for each intake stroke split injection falls in a fuel injection quantity zone. Therefore, the correction value for the fuel injection quantity zone is accurately determined through the fuel injection feedback control for maintaining an accurate stoichiometric air-fuel ratio or an approximate stoichiometric air-fuel ratio. The correction value is thereafter reflected on the fuel injection control during engine operation with stratified charge combustion.

The fuel injection control system may accomplish the fuel injection feedback control, the intake stroke split injection and the determining of a fuel injection quantity characteristic of the injector in the half-warmed state when the system is of the type which controls the engine to operate in the lean stratified charge combustion mode while the engine is in a warmed state in which the engine has attained a first threshold engine temperature. The system controls the injector to spray fuel so as to maintain the stoichiometric air-fuel ratio while the engine is in a half-warmed state in which the engine has attained a second threshold engine temperature lower than the first threshold engine temperature.

According to the fuel injection control system, the determining of a fuel injection quantity characteristic is accomplished in the half-warmed state immediately after an engine start and makes the determined characteristic reflect on the fuel injection control during engine operation with stratified charge combustion.

The fuel injection control system may divide the quantity of fuel injection desirably into two parts with a split ratio of 1:1 for early and later intake stroke split injection with the effect of making it simple and easy to determine an injection pulse width for intake stroke split injection and for gaining a precise correction value. The early and later intake stroke split injection may be made at such a timing that a middle point of time between the early and later intake stroke split injection is ahead of a middle point of an intake stroke, which improves mixing and diffusion of fuel.

When the fuel injection feedback control is based on the air-fuel ratio detected by the oxygen sensor, the intake stroke split injection and the determining of a fuel injection quantity characteristic of the injector are executed in an engine operating zone of lower engine loads and speeds, the fuel injection control system may perform each of the early and later intake stroke split injection with an injection pulse width approximately equal to a minimum injection pulse width for the compression stroke injection during engine operation with lean stratified charge combustion and control the quantity of fuel injection to restrain an increase in engine speed so as to make the engine speed remain low in the engine operating zone of lower engine loads and speeds.

According to the fuel injection control system, the correction value near a minimum injection pulse width during engine operation with lean stratified charge combustion is accurately determined. Specifically, when the correction value for a specific minute injection zone is determined by performing intake stroke split injection during operation of the fuel injection feedback control based on output from the oxygen sensor to try to maintain a stoichiometric air-fuel ratio the quantity of fuel injection increases due to thermal efficiency is inferior during ordinary engine idling to during engine operation with lean stratified charge combustion. Nevertheless, it is not doubled. A split injection pulse width becomes smaller than the minimum injection pulse width during engine operation with lean stratified charge combustion when dividing an injection pulse width corresponding to the quantity of fuel injection into two parts. However, in this embodiment, the correction value near the minimum injection pulse width during engine operation with lean stratified charge combustion is accurately determined by means of setting a split injection pulse width as large as a minimum injection pulse width during engine operation with lean stratified charge combustion. Further, although expanding an injection pulse width is apt to be accompanied by an increase in engine speed, the fuel injection control system can restrain the tendency to increase engine speed by, for example, retarding an ignition timing. In this instance, it is preferred that, while the fuel injection feedback control based on the air-fuel ratio detected by the oxygen sensor, the intake stroke split injection and the determining of a fuel injection quantity characteristic are accomplished in the engine operating zone of lower engine loads and speeds, the fuel injection control system controls a quantity of intake air introduced into the engine corresponding to the quantity of fuel injection for which a split injection pulse width for each intake stroke split injection is made approximately equal to a minimum injection pulse width for the compression stroke injection during engine operation with lean stratified charge combustion. As a result, while maintaining the stoichiometric air-fuel ratio, the quantity of intake air is controlled so as to deliver a quantity of fuel for which a split injection pulse width for each intake stroke split injection is made approximately equal to a minimum injection pulse width for the compression stroke injection during engine operation with lean stratified charge combustion.

The fuel injection control system may further include intake air flow control means for restraining a change in intake air flow rate caused due to the feedback control of idle speed while accomplishing the intake stroke split injection and the determining of fuel injection quantity characteristic of the injector during idling. The provision of intake air flow control means prevents determination of the accuracy of the determining of fuel injection quantity characteristic due to fluctuations of a controlled value by the fuel injection feedback control accompanying a change in intake air flow rate. The idle speed is controlled by fixing the intake air flow rate at a rate necessary for the engine operating with maximum external loads by the intake air flow control means together with controlling ignition timing. The intake air flow control means may extend a dead zone for the feedback control of the engine speed during idling in which a change in engine speed is allowed while accomplishing the intake stroke split injection and the determining of fuel injection quantity characteristic.

For a multiple cylinder direct injection-spark ignition engines, the fuel injection control system is adapted to perform both intake stroke split injection and determining of fuel injection quantity characteristic by cylinder in sequence while executing the fuel injection feedback control. Otherwise, for a multiple cylinder direct injection-spark ignition engine equipped with an exhaust manifold in which or downstream from which the oxygen sensor is disposed, and the fuel injection control system may be adapted to perform the fuel injection feedback control for a specific one of the cylinders based on the air-fuel ratio detected by the oxygen sensor at a specified timing which corresponds to a point of time at which an exhaust gas from the specific cylinder passes the oxygen sensor and determines the learning correction value for the specific cylinder based on a controlled value by the fuel injection feedback control. According to this embodiment, the fuel injection control system can determines a learning correction value by cylinder with improved accuracy. The fuel injection control system desirably perform overall determining of fuel injection quantity characteristic in which an average value of controlled values by the fuel injection feedback control is determined for all of the cylinders as an overall learning correction value and subsequently determining the correction value for each specific cylinder based on a controlled value by the fuel injection feedback control for the specific cylinder after reflecting the overall correction value on the quantity of fuel injection for the specific cylinder. In order to efficaciously determine a learning correction value by cylinder it is preferred to determine a deviation of output provided at a specified timing by the oxygen sensor from output from the oxygen sensor representative of the stoichiometric air-fuel ratio by cylinder and accomplish the learning of fuel injection quantity characteristic by cylinder in order of amplitude of the deviations for the respective cylinders to determine a learning correction value by cylinder based on the quantity of fuel injection controlled according to the output from the oxygen sensor in that order. The accuracy of determination is even more increased by virtue of the correction value by cylinder determined in this manner. Specifically, when accomplishing the fuel injection feedback control based on an air-fuel ratio detected by the oxygen sensor and the determining of fuel injection quantity characteristic according to the quantity of controlled fuel injection, although output from the oxygen sensor is adversely effected by an exhaust gas discharged from a previous cylinder and staying around the oxygen sensor, the degree of adverse effect of the exhaust gas from the previous cylinder on the oxygen sensor is relatively lowered by means of determining a fuel injection quantity characteristic by cylinder in order of amplitude of the deviations for the respective cylinders. Hence, the accuracy of fuel injection feedback control by cylinder and the accuracy of the determining of fuel injection quantity characteristic according to the quantity of controlled fuel injection are increased. The fuel injection control system may be adapted to execute the determining of the fuel injection quantity characteristics for intake stroke non-split injection and intake stroke split injection in the same fuel injection quantity zone, which makes it possible to specify the relationship between the fuel injection quantity characteristics.

BRIEF DESCRIPTION OF THE DRAWINGS

The above and other objects and features of the present invention will be understood from the following description of a specific embodiment thereof when considered in conjunction with the accompanying drawings, in which:

FIG. 7 is a flow chart illustrating another sequential routine of fuel injection quantity characteristic control for the microcomputer of the engine control unit;

FIG. 14 is a functional block diagram showing another engine control unit (PCM)

DETAILED DESCRIPTION OF THE SPECIFIC EMBODIMENT

Figure 1:
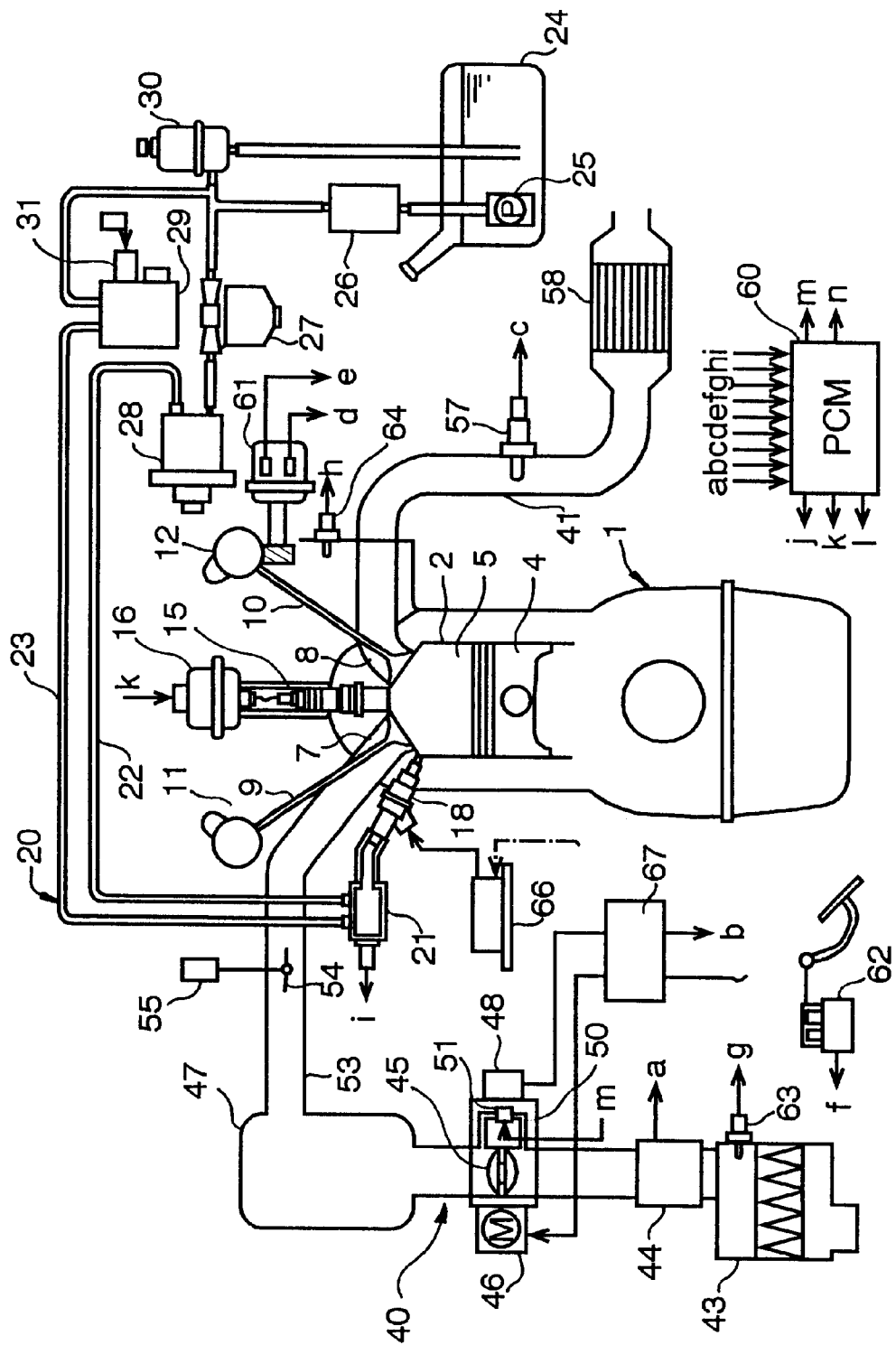
FIG. 1 is a schematic view showing an engine equipped with a fuel injection control system in accordance with an embodiment of the invention.
Figure 2:
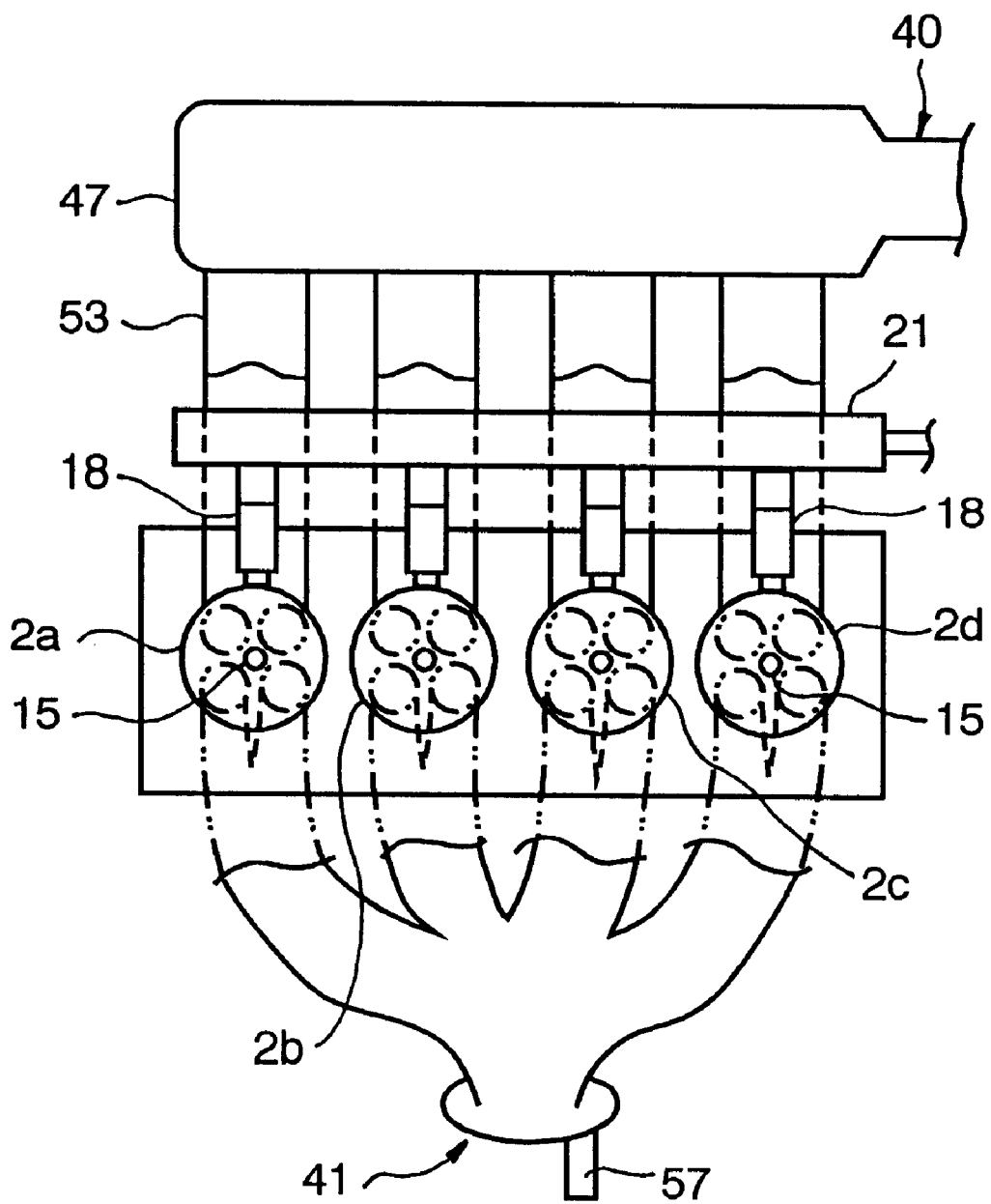
FIG. 2 is a plan view of an engine body.

Referring to the drawings, in particular to FIGS. 1 and 2 schematically showing a direct injection-spark ignition type of engine equipped with an engine control system of the present invention, an engine body 1 has a plurality of, for example four, cylinders 2 (2a to 2d in FIG. 2) in which combustion chambers 5 are formed by tops of pistons 4, a lower wall of a cylinder head and cylinder bores. An intake port and an exhaust port open into the combustion chamber 5 and are opened and shut at a predetermined timing by an intake valve 9 and an exhaust valve 10, respectively. The intake valve 9 is driven by a valve lift mechanism incorporating an intake cam shaft 11. The exhaust valve 10 is driven by a valve lift mechanism incorporating an exhaust cam shaft 12. A spark plug 15 is disposed with its electrode tip exposed to a center part of the combustion chamber 5. The spark plug 15 is connected to an ignition coil 16. A fuel injector 18 has a nozzle installed in a side wall of the combustion chamber 5 through which fuel is sprayed directly into the combustion chamber 5. Fuel is supplied to the fuel injector 18 through a fuel delivery line 21 of a fuel system 20. This fuel system 20 includes a fuel tank 24, a high pressure fuel pump 28, a high pressure regulator 29 and a low pressure regulator 30. A fuel supply line 22 leads to the fuel delivery line 21 from the fuel tank 24 via the high pressure fuel pump 28, and a fuel return line 23 leads to the fuel tank 24 from the fuel delivery line 21 via the high pressure regulator 29 and the low pressure regulator 30. The fuel supply line 22 is provided with filters 26 and 27 between the fuel tank 24 and the high pressure fuel pump 28. The fuel return line 23 is provided with a bypass valve 31 operative to permit return fuel to bypass the high pressure regulator 29 through a bypass line (not shown) so as thereby to change fuel pressure. Specifically, when the bypass valve 31 is closed while the high pressure regulator 28 remains actuated, the high pressure regulator 29 regulates and adjusts the pressure of fuel to a predetermined high pressure level. When the bypass valve 31 is opened, the high pressure regulator 29 is made substantially inactive and the high pressure regulator 28 regulates and adjusts the pressure of fuel to a predetermined low pressure level.

Intake air is introduced into the engine through an intake line 40 equipped with an air cleaner 43, an air flow sensor 44, a motor driven throttle valve 45 and a surge tank 47 arranged in this order from the upstream side. The throttle valve 45 is driven by an electric motor 46. An opening or position sensor 48 is provided to monitor a position or opening of the throttle valve 45. The intake line 40 is provided with an idle speed control (ISC) line 50 with an idle speed control (ISC) valve 51 operative to control an air flow rate of intake air passing through the idle speed control (ISC) line 50. The intake line 50 branches off into discrete intake lines 53 leading to intake ports 7 of the cylinders 2, respectively, from the surge tank 47. Each discrete intake line 53 is provided with a swirl control valve 54 actuated by, for example, a stepping motor 55 to control a swirl of intake air. Exhaust gas is discharged through an exhaust line 41 equipped with an oxygen ($O_2$) sensor 57 and a catalytic converter 58 in this order from the upstream side. The oxygen ($O_2$) sensor 57 is disposed in close proximity to an exhaust manifold and monitors an oxygen ($O_2$) concentration of the exhaust gas by which the air-fuel ratio of a fuel mixture burnt in the engine is represented. A $\lambda$ oxygen ($O_2$) sensor may be employed. As is well known in the art, the $\lambda$ oxygen ($O_2$) sensor provides output which is reversed at a boundary of a stoichiometric air-fuel ratio represented by an air excess ratio ($\lambda$) of 1 (one).

Operation of the engine is controlled by an engine control unit (PCM) 60. The engine control unit (PCM) 60 receives various signals including a signal a representative of an air flow rate afs from the air flow sensor 44, a signal b representative of an engine load prescribed by a throttle position tvo of the throttle valve 45 from the position sensor 48, a signal c representative of an oxygen ($O_2$) concentration of exhaust gas from the oxygen ($O_2$) sensor 57, signals d and e representative of a crank angle from a distributor 61 for determining an engine speed ne and a cylinder number, a signal f representative of an accelerator pedal travel accel from an accelerator pedal position sensor 62, a signal g representative of a temperature of intake air from a temperature sensor 63 and a signal h representative of a temperature Tw of engine cooling water from a temperature sensor 64. On the other hand, the engine control unit (PCM) 60 provides various control signals including a fuel injection control signal or pulse j for controlling the fuel injector 18 through an injector drive unit 66, an ignition timing control signal k which is directed to the ignition coil 16, a throttle position control signal l for controlling the electric motor 46 through a throttle drive unit 67, an idle speed control signal m for controlling the idle speed control (ISC) valve 51 and a bypass valve control signal n for controlling the bypass valve 31.

Figure 3:
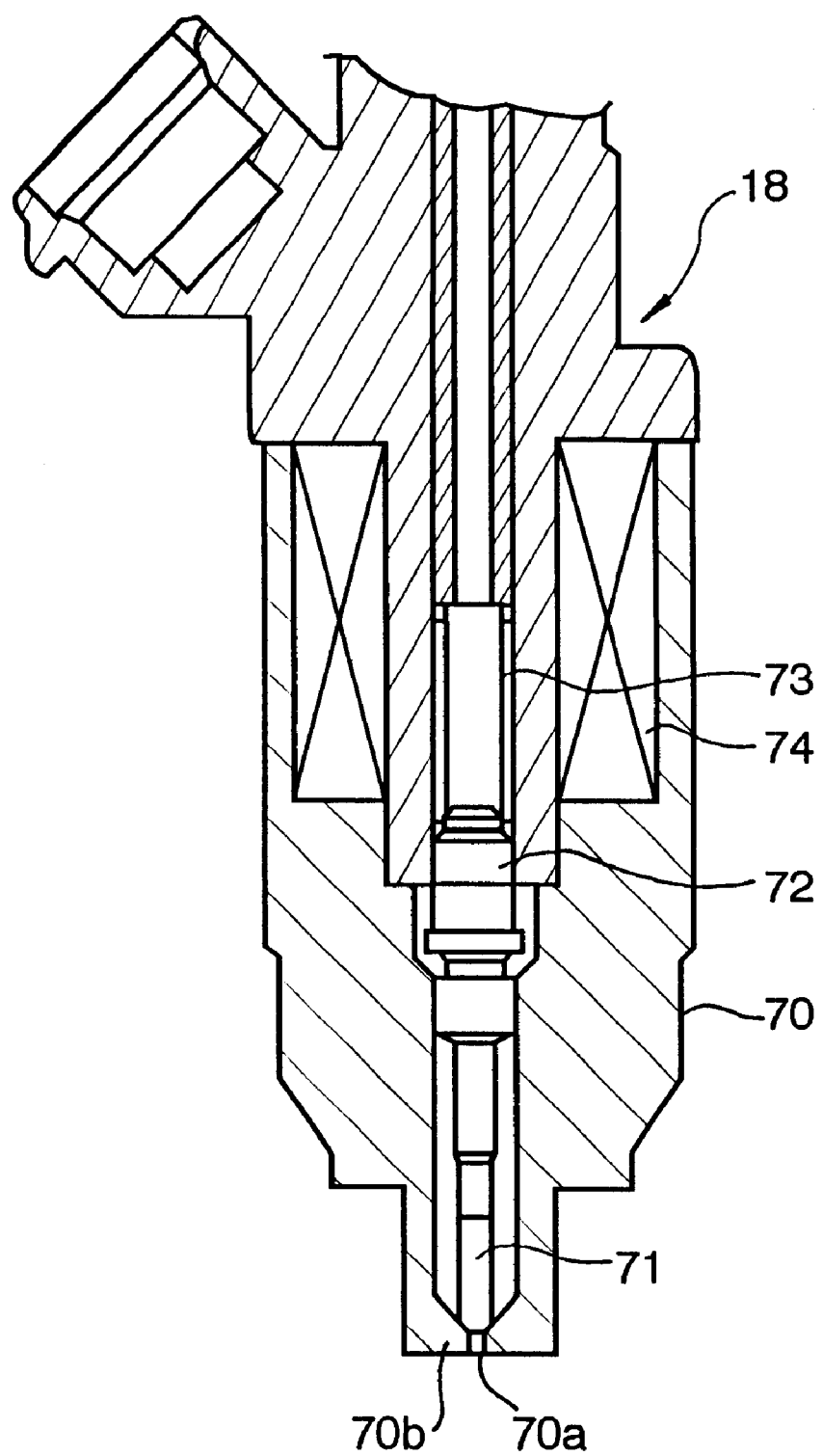
FIG. 3 is a cross sectional view of an injector.

Referring to FIG. 3 showing the fuel injector 18 in detail, the fuel injector 18 has an injector hosing 70 formed with an injector nozzle 70a at its tip end and a valve seat 70b. In the inside of the fuel housing 70 there are a needle valve 71 operative to open and shut the nozzle 70a, a plunger 72 operative to cause the needle valve to move up and down, a return spring 73 biasing the plunger 72 to force the needle valve 71 in a direction in which the nozzle 70a is shut, and a coil 74 operative to actuate the plunger 72 against the return spring 73. Fuel is introduced into the injector housing 70 through a center passage 70c leading to the nozzle 70a. The fuel injection pulse j is sent to the coil 74 through the injector drive unit 66 to actuate the plunger 72 to drive the needle valve 71 so as to open the nozzle 70a for a time according to a width of the fuel injection pulse j.

Figure 4:
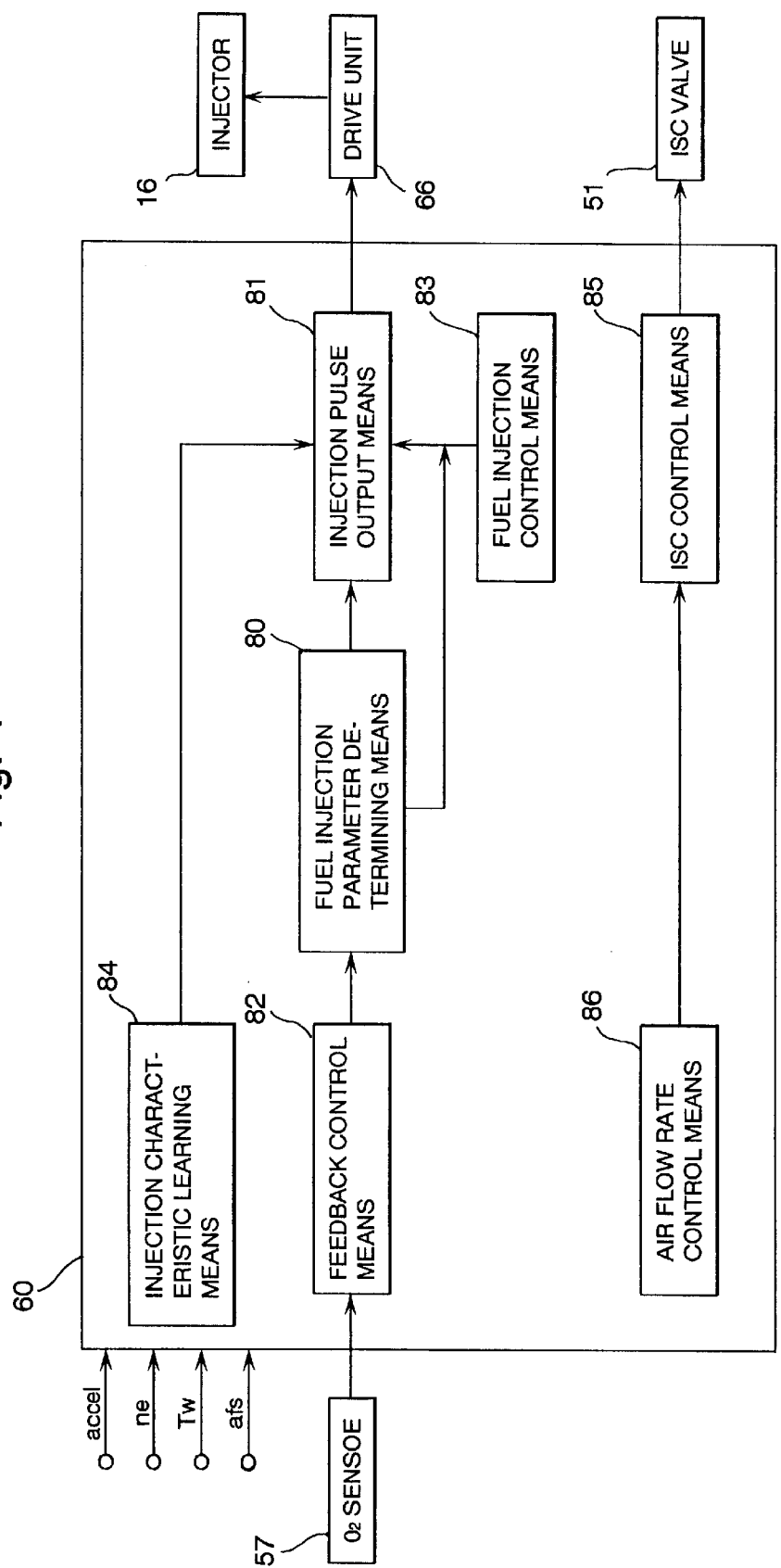
FIG. 4 is a functional block diagram showing an engine control unit (PCM)

Referring to FIG. 4 showing the engine control unit (PCM) 60 in detail, the engine control unit (PCM) 60, which is comprised of a microcomputer, has functional means including fuel injection control parameter determining means 80 for determining the quantity of fuel injection and a fuel injection timing, injection pulse determining means 81 for determining an injection pulse width, fuel injection feedback control means 82, fuel injection control means 83 and injection characteristic learning means 84. The fuel injection control parameter determining means 80 determines the quantity of fuel injection based on a basic quantity of fuel injection according to engine operating conditions with reference to a fuel quantity control map, a feedback control correction value and other control correction values and determines a fuel injection timing according to engine operating conditions with reference to a fuel injection timing control map. Control of increasing the quantity of intake air by throttle control means (not shown) is made together with the control of the quantity of fuel injection so as to perform combustion in different patterns according to engine operating conditions. In a zone of engine loads and speeds lower than specified load and speed, respectively, while fuel injection is performed in a later half of a compression stroke, the quantities of intake air and fuel are controlled to perform stratified charge combustion with a lean fuel mixture (which is hereafter referred to as lean stratified charge combustion). In a zone of engine loads and speeds higher than the specified load and speed, while fuel injection is performed in an intake stroke, the quantities of intake air and fuel are controlled to perform homogeneous charge combustion with a lean fuel mixture (which is hereafter referred to as lean homogeneous charge combustion) for lower engine loads and speeds or to perform homogeneous charge combustion with a stoichiometric fuel mixture (which is hereafter referred to as stoichiometric homogeneous charge combustion) for higher engine loads and speeds. The quantity of fuel injection determined in the fuel injection control parameter determining means 80 is converted into an injection pulse width in the injection pulse determining means 81. An injection pulse with a pulse width is provided at an injection timing to actuate the fuel injector 18 through the injector drive unit 66.

Figure 5:
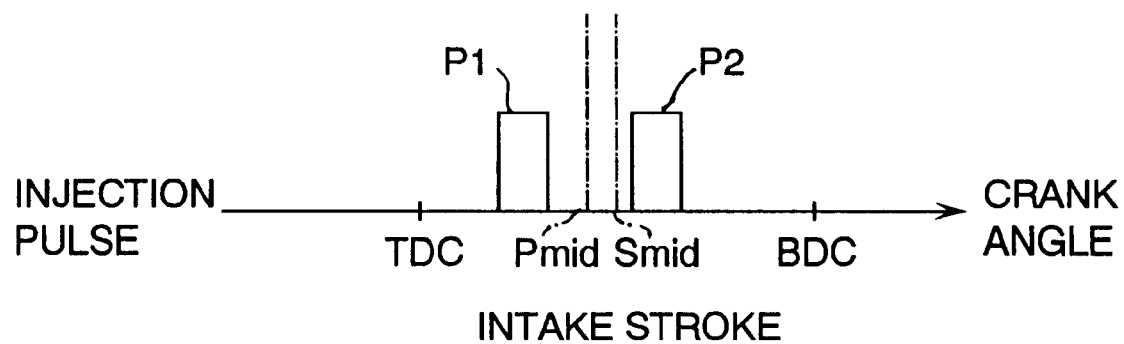
FIG. 5 is an injection pulse diagram for intake stroke split injection.

The fuel injection feedback control means 82 feedback controls the quantity of fuel injection according to an oxygen ($O_2$) concentration of exhaust gas represented by a signal c from the oxygen ($O_2$) sensor 57 to provide a stoichiometric air-fuel ratio while the engine is operated in a predetermined engine operating state for the fuel injection feedback control. Specifically, in the fuel injection control parameter determining means 80, an eventual quantity of fuel injection is determined based on the basic quantity of fuel injection and a feedback control correction value (a feedback correction term in PI control) which is determined based on the oxygen ($O_2$) concentration by, for example, proportional integral (PI) control. This feedback control of fuel injection is accomplished in the stoichiometric homogeneous charge combustion zone and further accomplished to let the engine warm up quickly for an early period after an engine start. Under specified engine operating conditions such as warming up, the fuel injection control means 83 splits fuel injection into a plurality of small parts by dividing the injection pulse with the pulse width determined in the injection pulse determining means 81 into the same number of parts. In this embodiment, the injection pulse is divided into two parts P1 and P2 with a split ratio of 1:1 as shown in FIG. 5. The split injection pulses P1 and P2 are timed such that the middle point of time Pmid between early and later split fuel injection is before the middle point of time between top and bottom dead centers of (TDC and BDC) an intake stroke Smid as shown in FIG. 5. The results a that fuel is sprayed in a period for an intake stroke in which intake air is admitted at a high flow rate or fuel having been sprayed is spread in the combustion chamber in that period and in consequence the fuel is sufficiently mixed and expeditiously diffused by intake air. During execution of the split fuel injection control in an intake stroke, a characteristic of fuel injection quantity (which is referred to as a fuel injection quantity characteristic), i.e. a correlation between the quantity of fuel injection and the injection pulse width of a split injection pulse, is determined based on the feedback control correction value (the feedback correction term) to determine a learning correction value in the injection characteristic learning means 84. The engine control unit (PCM) 60 preferably has air flow rate change control means 86 for controlling a change in intake air flow rate caused due to idle speed control while the split fuel injection and the fuel injection quantity characteristic determining are performed during idling and idle speed control (ISC) means 83.

Figure 6:
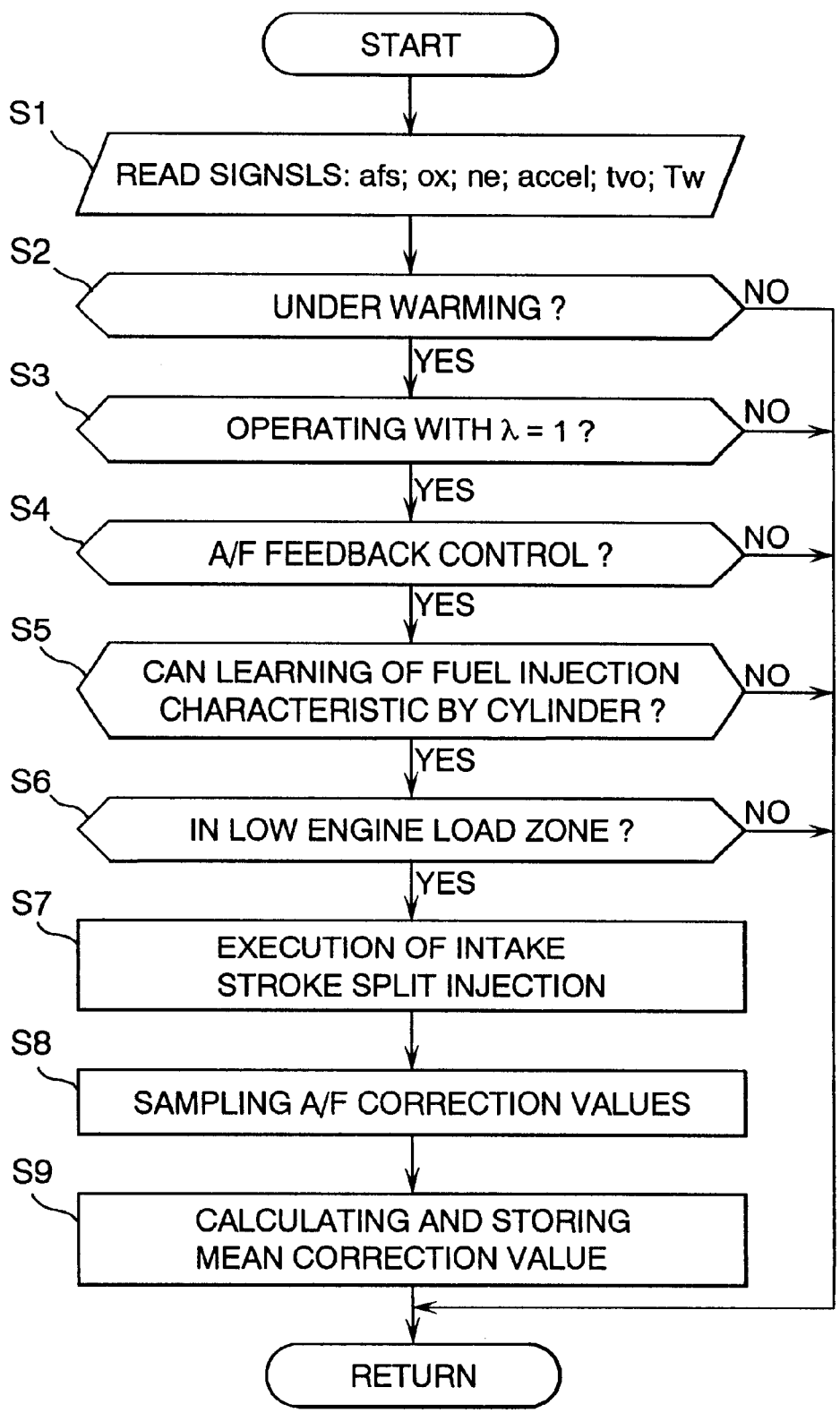
FIG. 6 is a flow chart illustrating a sequential routine of fuel injection quantity characteristic control for a microcomputer of the engine control unit.

FIG. 6 is a flow chart illustrating a sequence routine of the fuel injection quantity characteristic learning control during idling for the microcomputer of the engine control unit (PCM) 60. As shown, when the flow chart logic commences and control proceeds directly to a function block at step S1 where signals are read in to monitor various control parameters including, at least, an air flow rate afs, an oxygen concentration of exhaust gas ox, an engine speed ne, an accelerator pedal travel accel, a throttle position tvo and an engine cooling water temperature Tw. Then, judgments are consecutively made at step S2 through S6. Specifically, at step S2, a judgment is made based on the engine cooling water temperature Tw as to whether the engine is under warming up. At step S3, a judgment is made based on the oxygen concentration of exhaust gas ox and throttle position tvo as to whether the engine is operated with a stoichiometric air-fuel ratio (which is represented by an air excess ratio $\lambda$ of 1). At step S4, a judgment is made as to whether the feedback control of air-fuel ratio (A/F-F/B control) is under execution. At step S5, ajudgment is made as to whether the learning of fuel injection quantity characteristic can be executed. In this instance, the air-fuel ratio feedback control is executed while the engine cooling water is in a zone of temperatures for half-warm engine operation, i.e. between a low level specified for cold engine operation and a high level specified for warmed-up engine operation. The fuel injection quantity characteristic learning control is permitted only during an ordinary engine operation. This is because, even while the air-fuel ratio feedback control is under execution, it is difficult to accurately determining the fuel injection quantity characteristic during a transitional state of engine operating condition, such as acceleration or deceleration, where a change in intake air flow rate occurs.

At step S6, a judgment is further made as to whether the engine load is in a zone of engine loads lower than a predetermined threshold value Ltvo for which the quantity of fuel injection is within a specific minute injection zone B shown in FIG. 12 which will be described later. All of the answers to the judgments made at steps S2 through S6 are affirmative, then learning correction value is determined through steps S7 through S9. However, if any one of the answers to the judgments made at steps S2 through S6 is negative, the flow chart logic orders return for another execution of the sequence routine. At step S7, intake stroke split injection is performed with a split ratio of 1:1. While the air-fuel ratio feedback control is under execution, an air-fuel ratio feedback control correction value Cfb is determined according to the oxygen concentration of exhaust gas ox detected by the oxygen ($O_2$) sensor 57. The pulse width is obtained by converting the quantity of fuel injection determined based on the feedback control correction value (Cfb) and the basic quantity of fuel injection with a conversion factor. The pulse width is divided into two parts with the split ratio. Fuel is timely sprayed through the intake stroke split injection according to the pulse widths P1 and P2 in an intake stroke as shown in FIG. 5. A specified number of the air-fuel ratio feedback control correction values are sampled at step S8. Subsequently, at step S9, a mean value of the sampled air-fuel ratio feedback control correction values is calculated as a coefficient and stored as a learning correction value for a fuel injection quantity zone in which the respective intake stroke split injection are performed.

Figure 12:
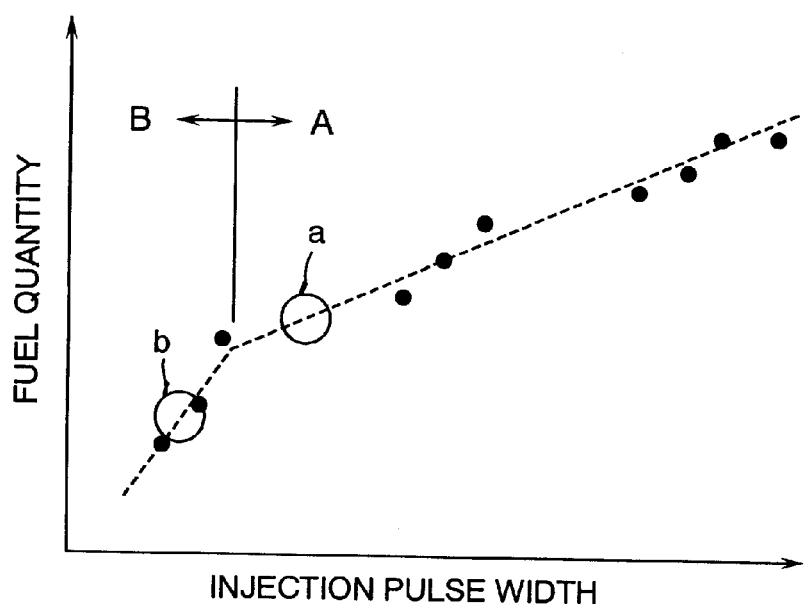
FIG. 12 is a diagram showing a fuel injection quantity characteristic of the injector.
Figure 13:
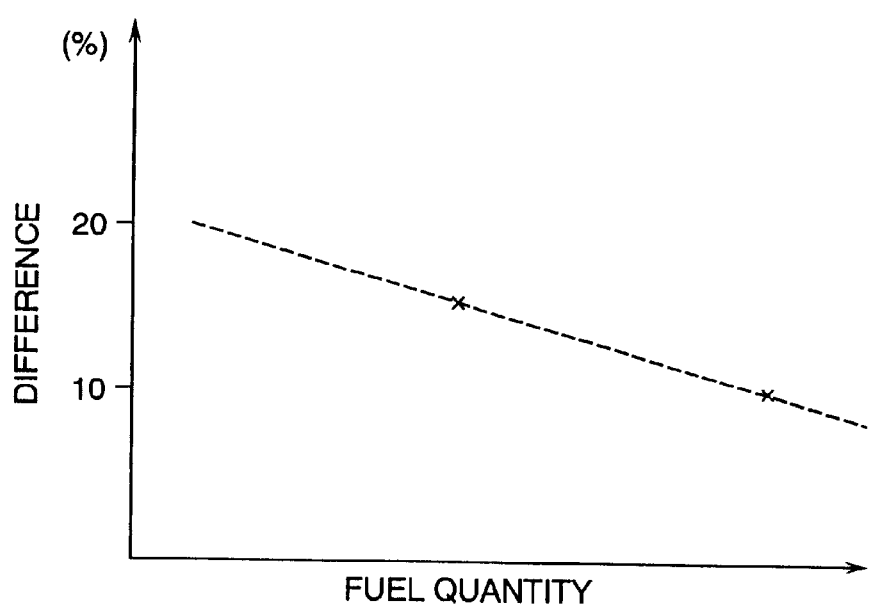
FIG. 13 is a diagram showing the quantity of fuel injection with respect to fuel injection quantity characteristics of injectors.
Figure 15A:
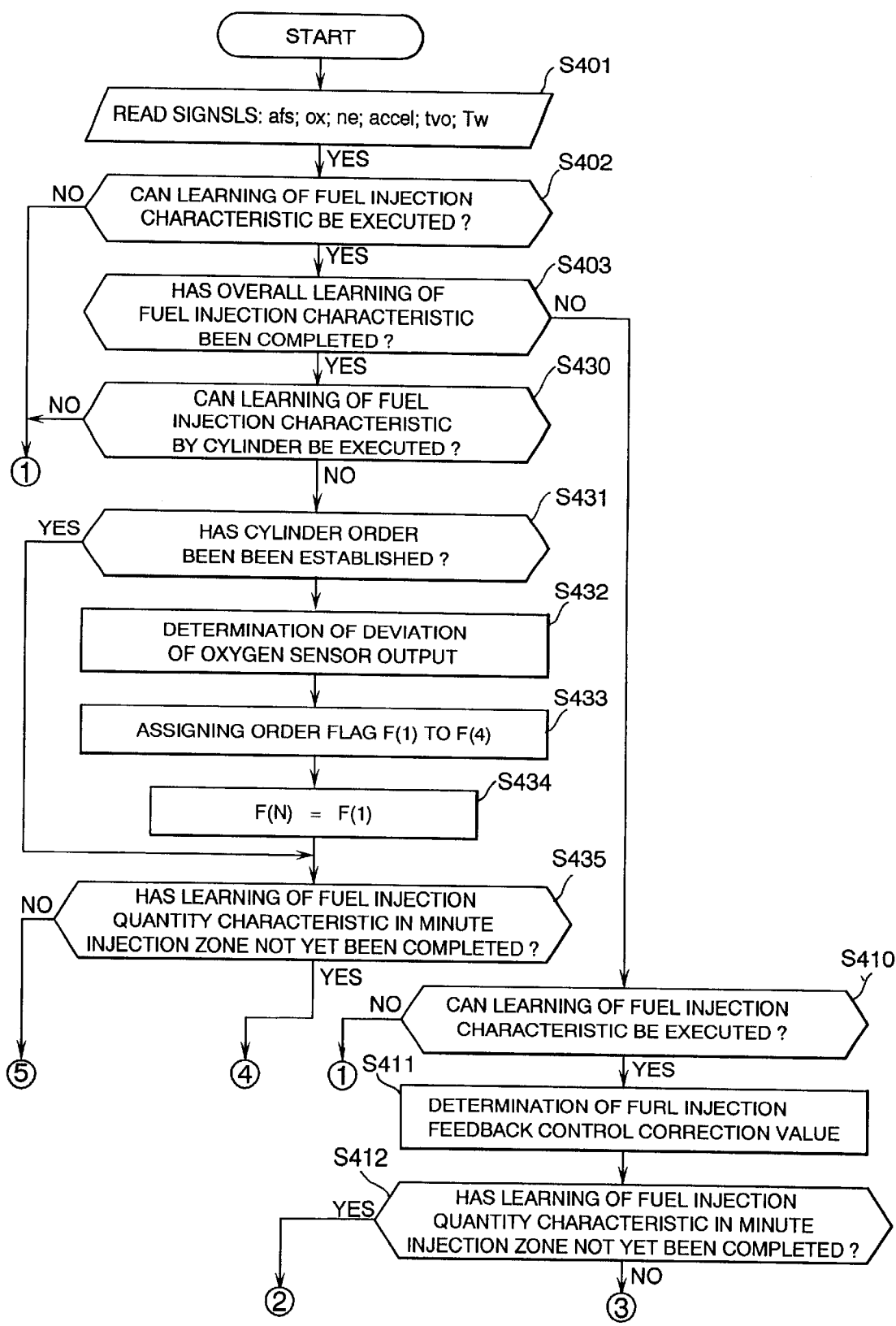
FIGS. 15A to 15D are flow charts illustrating another sequential routine of fuel injection quantity characteristic control for a microcomputer of the engine control unit shown in FIG. 14.
Figure 15B:
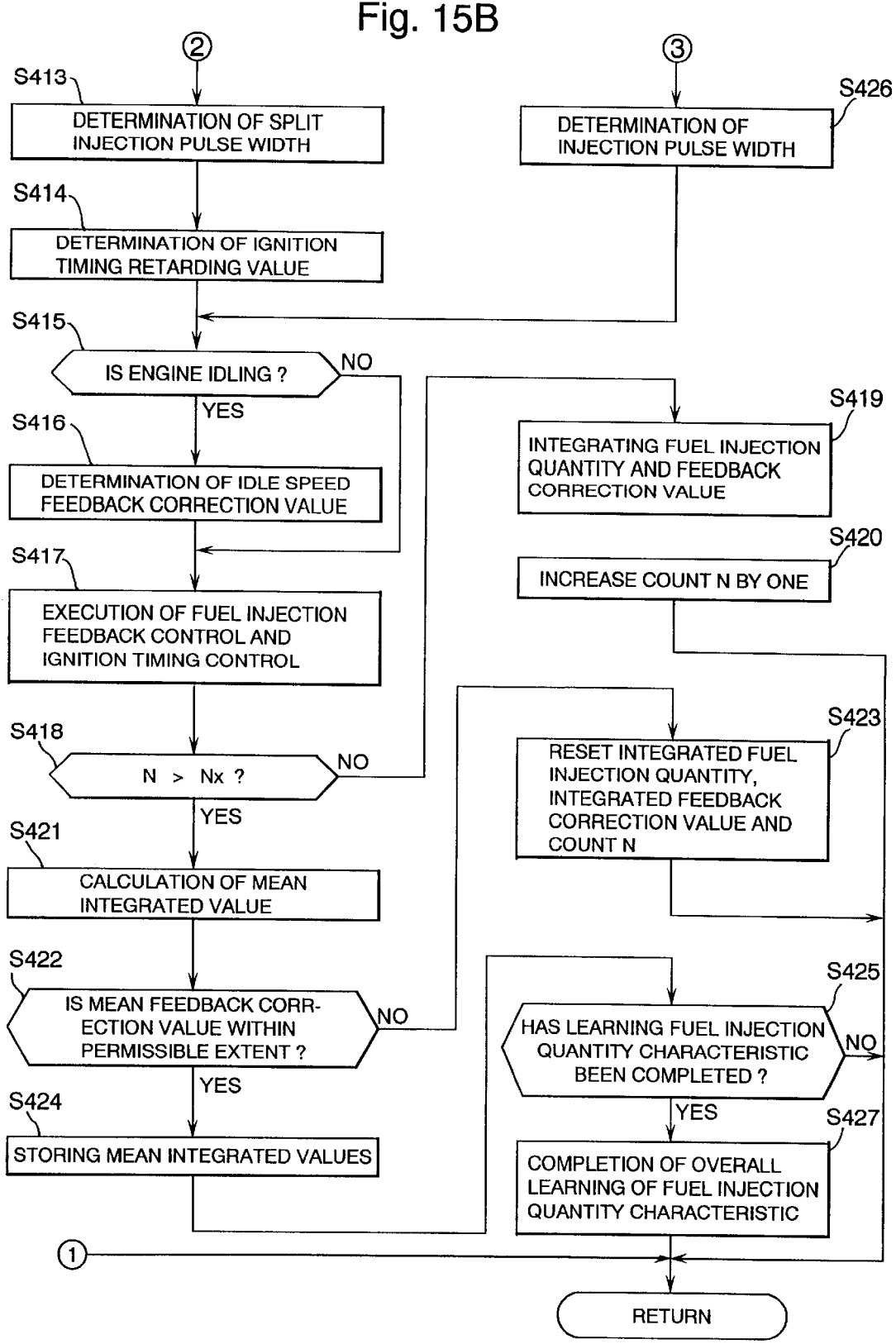
Figure 15C:
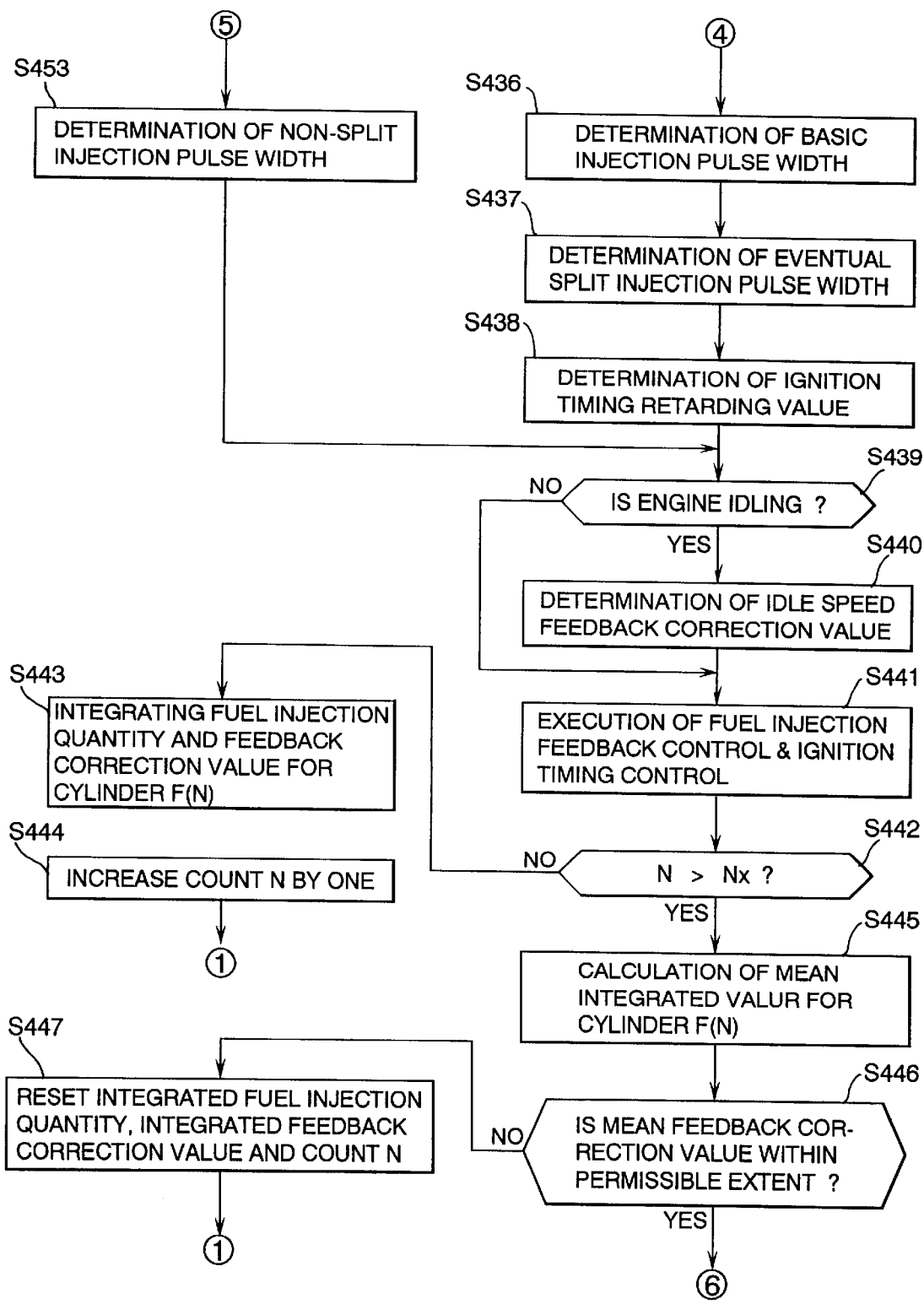
Figure 15D:
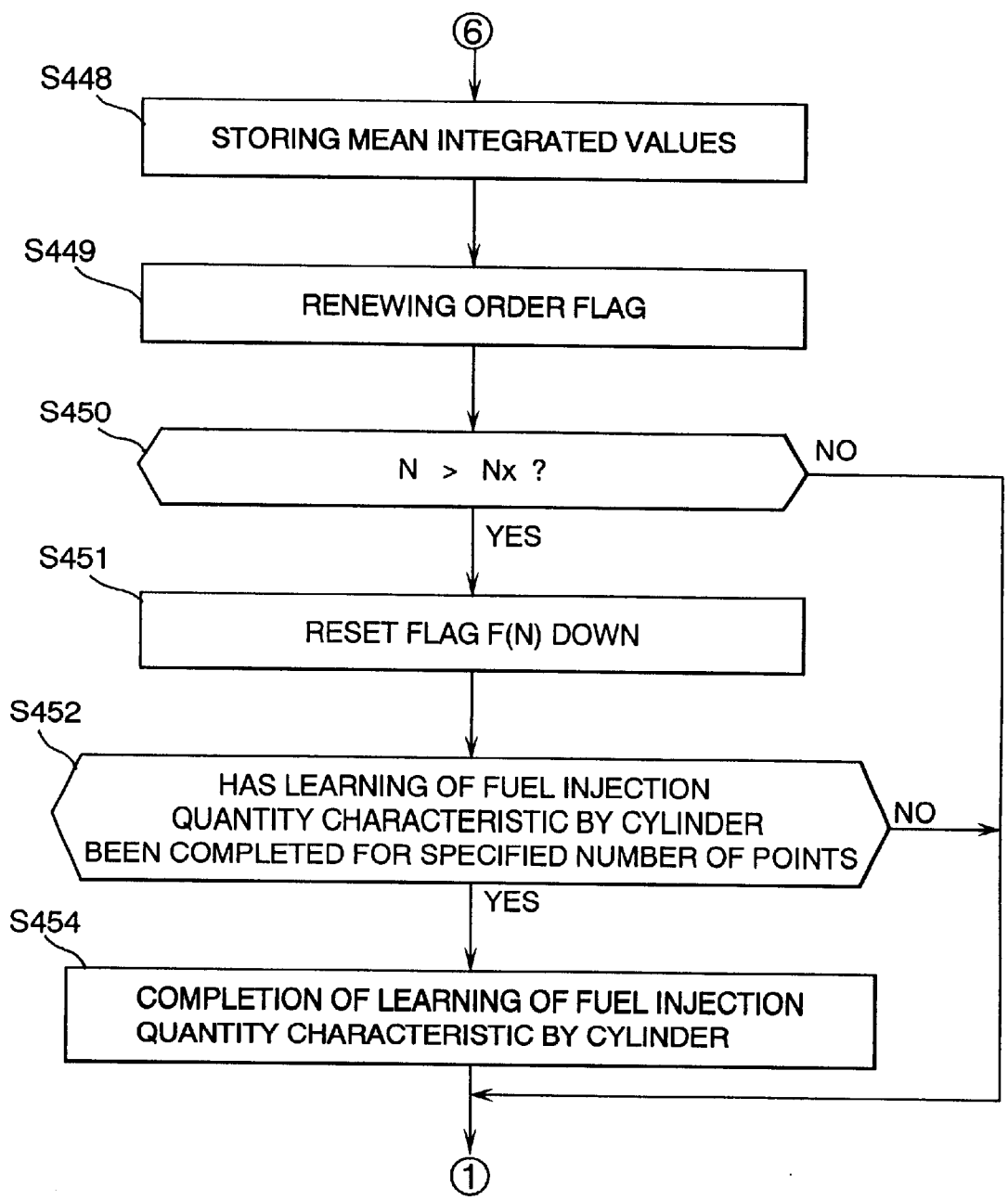

According to the fuel injection quantity characteristic learning control, the correlation between injection pulse width and the quantity of fuel injection is accurate even in the minute injection zone B in which the quantity of fuel injection is smaller with respect to a specific pulse width than in the normal injection zone A shown in FIG. 12, providing a precise learning correction value is applied. Specifically, if there occurs conversion errors of injection pulse width resulting from divergences of correlations between injection pulse width and the quantity of fuel injection for the same model of injectors due to individual differences and the like of the injectors, the conversion error reflects on the feedback control correction value, so that an accurate learning correction value according to the divergence of correlation based on the feedback control correction value can be determined. In this instance, because, during the air-fuel ratio feedback control, it is always tried to maintain a stoichiometric air-fuel ratio and, in consequence, the thermal efficiency is inferior during stoichiometric charge combustion to during lean stratified charge combustion, so that fuel injection is performed in a fuel injection quantity zone (a) which is greater than the fuel injection quantity zone (b) in the minute injection zone B. However, because, in the fuel injection quantity characteristic learning control shown by the flow chart depicted in FIG. 6, fuel injection is divided into two parts in an intake stroke, each intake stroke split injection is performed in the fuel injection quantity zone (b) in the minute injection zone B and the learning correction value is obtained for the fuel injection quantity characteristic specified for the minute injection zone B through steps S6 through S8.

Fuel may be divided into two unequal parts for early and later intake stroke split injection with a split ratio of, for example, 7:3. However, in such a case, these intake stroke split injection are performed in different fuel injection quantity zones and the correlation between injection pulse width and the quantity of fuel injection is different between these different fuel injection quantity zones in the minute injection zone B, so that an accurate learning correction value can not always be obtained by dividing proportionally a mean value of sampled feedback control correction values according to the split ratio. Contrarily to this, according to the above embodiment in which fuel injection is divided with a split ratio of 1:1, the pulse widths for the early and later intake stroke split injection are within the same fuel injection quantity zone, as a result of which the learning correction value for the zone is accurate.

After execution of the fuel injection quantity characteristic learning control, the result of the control reflects on the control of fuel injection during stratified charge combustion following fuel injection in a compression stroke while the engine operates in a zone of lower engine loads and speeds after warming up. Specifically, when the air-fuel ratio becomes greater than the stoichiometric ratio as a result of stratified charge combustion fuel injection in a compression stroke in the zone of lower engine loads and speeds, the quantity of fuel injection is reduced following an increase in thermal efficiency, possibly entering a fuel injection quantity zone (b) in the minute injection zone B. In such an event, the quantity of fuel injection determined based on the accelerator pedal travel and the engine speed is converted into an injection pulse width in consideration with the learning correction value, the control of the quantity of fuel injection is performed with a high precision.

FIG. 7 is a flow chart illustrating a variation of the sequence routine of the fuel injection quantity characteristic learning control in which steps S101 through S106 for control of a change in intake air flow rate which is performed in the air flow rate change control means 86 is added. If any one of the answers to the judgments made at steps S2 through S6 is negative, the flow chart logic orders return for another execution of the sequence routine. On the other hand, when all of the answers to the judgments made at steps S2 through S6 are affirmative, a judgment is made at step S101 as to whether the engine is idling. When the engine is idling, the idle speed control (ISC) valve 51 is controlled to maintain an opening balancing a quantity of intake air which is assumed for a maximum external engine load during idling at step S102, and the idling speed is controlled through feedback control of advancement of an ignition timing only at step S103. That is, while the idling speed tends to increase as the external engine load drops from the maximum external engine load, it is maintained at a target speed by controlling engine output torque by retarding the ignition timing according to the drop in external engine load. Subsequently, after extending a dead zone for idle speed feedback control zone in which a change in idle speed is allowed) and reducing a feedback control gain at step S104 or when the engine is not idling at step S106, a learning correction value is directly determined through steps S7 through S9.

According to the fuel injection quantity characteristic learning control shown in FIG. 7, while the engine is idling during execution of the air-fuel ratio feedback control in the half-warmed engine operation zone, the air-fuel ratio feedback control is prevented from encountering determination of learning accuracy through execution of the idle speed feedback control. That is, while the accuracy of fuel injection quantity characteristic determination is deteriorated due to an easy occurrence of a change in air-fuel ratio feedback control correction value if changing the intake air flow rate by controlling the idle speed control (ISC) valve 51 likely during ordinary feedback idle speed feedback control, nevertheless the accuracy of fuel injection quantity characteristic determination is increased by fixing the quantity of intake air. Even though a change in idle speed is too great to be controlled sufficiently by governing an ignition timing in the event of an occurrence of a great change in external engine load, controlling the quantity of intake air can be concluded with a change as small as possible by means of extending the dead zone for idle speed feedback control and/or reducing the gain of idle speed feedback control. In the case where a change in external engine load is coped with by controlling an ignition timing, the process at step S104 may be left out.

Figure 8A:
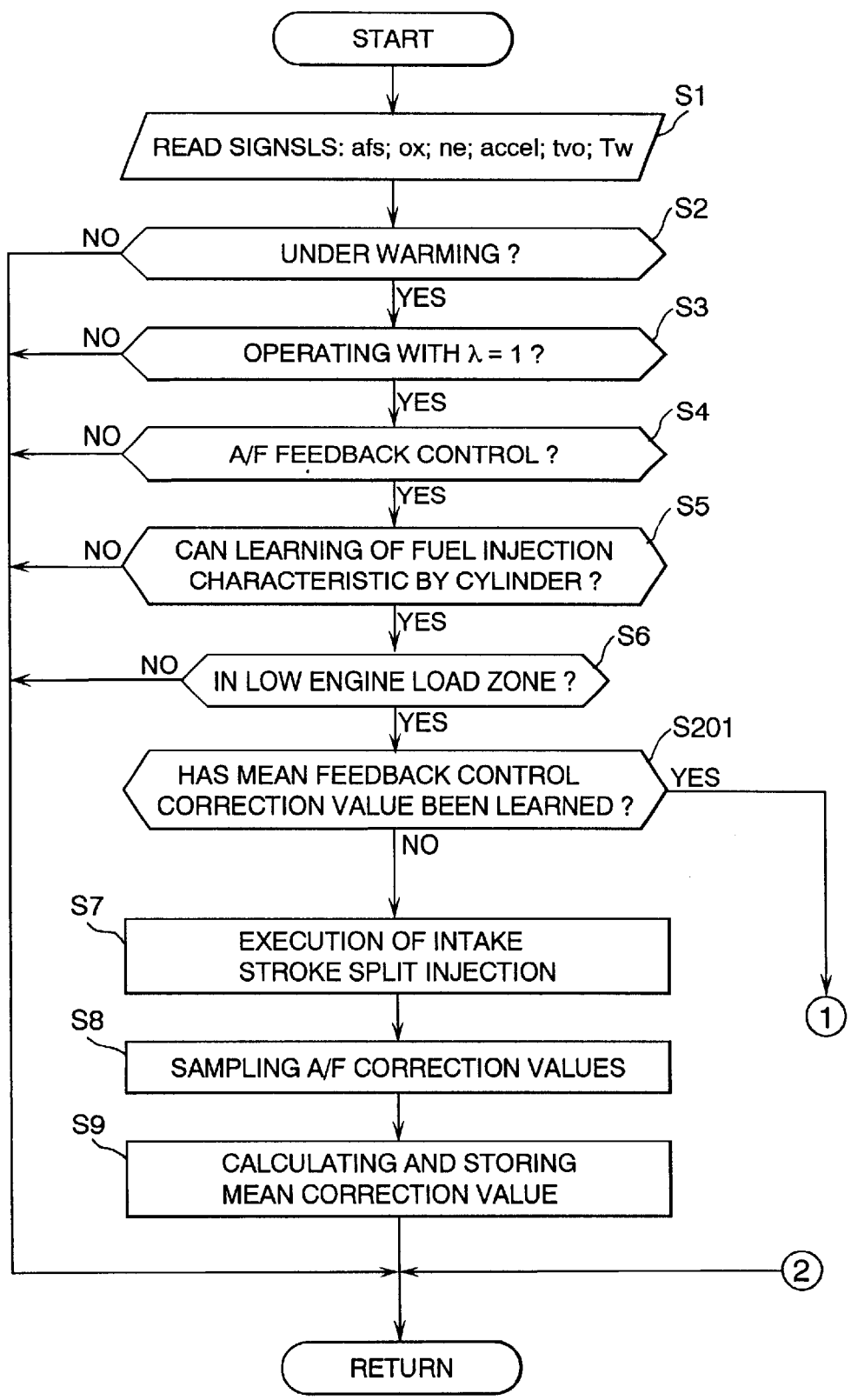
FIGS. 8A and 8B are flow charts illustrating still another sequential routine of fuel injection quantity characteristic control for the microcomputer of the engine control unit.
Figure 8B:
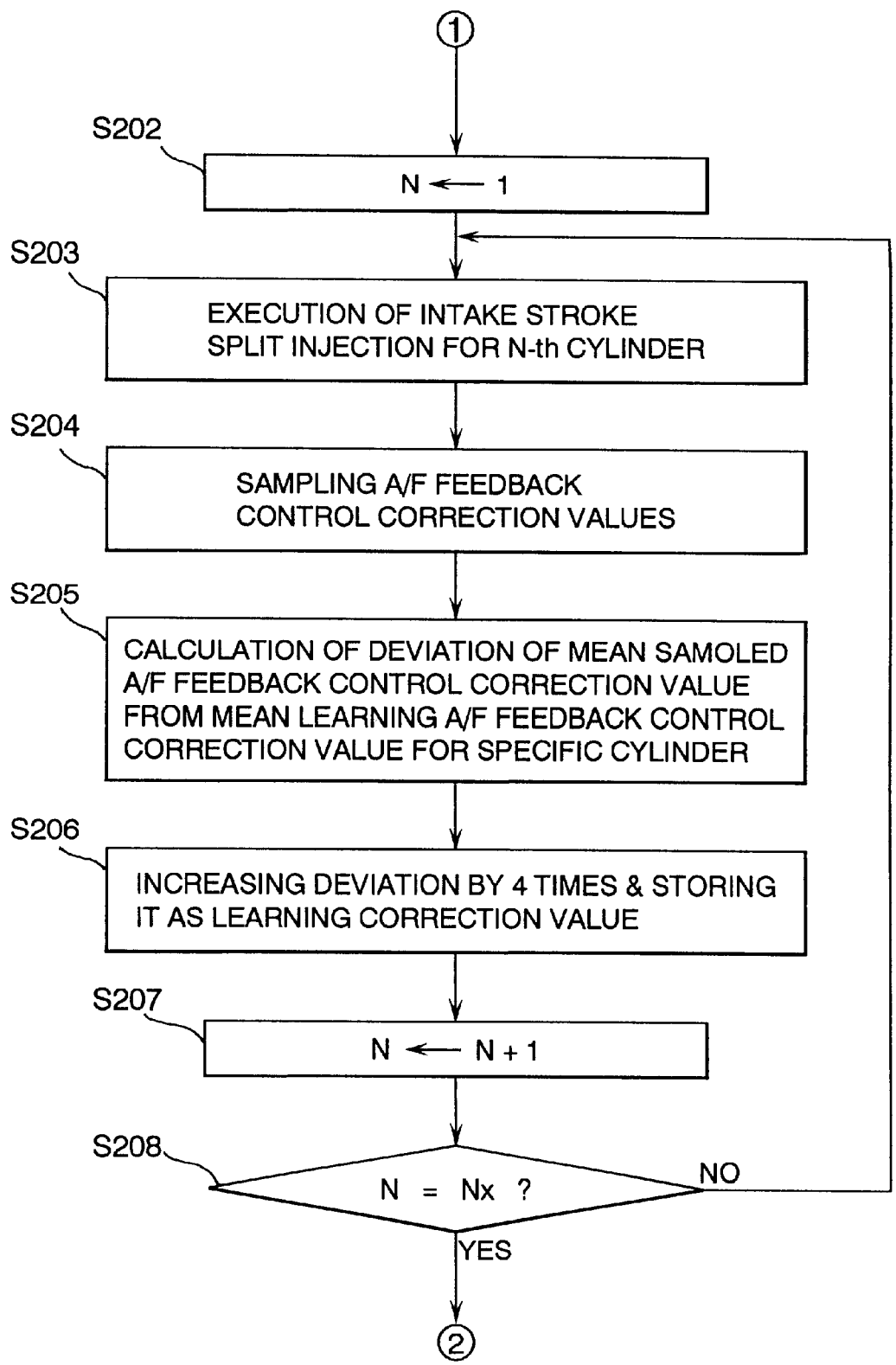

FIG. 8 is a flow chart illustrating another variation of the sequence routine of the fuel injection quantity characteristic determination control in which steps S201 through S208 are added. If any one of the answers to the judgments made at steps S2 through S6 is negative, the flow chart logic orders return for another execution of the sequence routine. On the other hand, when all of the answers to the judgments made at steps S2 through S6 are affirmative, a judgment is made at step S201 as to whether a mean value of feedback control correction values has been learned for all of the cylinders 2 in the present fuel injection quantity zone. When the answer to the judgment is negative, a learning correction value is directly determined through steps S7 through S9 and, thereafter, the flow chart logic orders return for another execution of the sequence routine. Because the intake stroke split injection is performed through each injector 18, the learning correction value is a mean value of feedback control correction values for all of the injectors 18. On the other hand, when the answer to the judgement at step S201 is affirmative, this indicates that a learning correction value has been determined through steps S7 through S9, then, learning correction control is performed for the respective injectors 10 through steps S202 through S208. After changing the count N of a cylinder number counter to 1 (one) at step S202, the intake stroke split injection is performed with a split ratio of 1:1 through the injector 18 for an N-th cylinder 2 at step S203. At this time, intake stroke non-split fuel injection is performed through the remaining injectors 18. A specified number of air-fuel ratio feedback control correction values are sampled at step S204. Subsequently, at step S205, a mean value of the sampled air-fuel ratio feedback control correction values is calculated and a deviation of the mean air-fuel ratio feedback control correction value for the injector 18 for the N-th cylinder 2 from the mean air-fuel ratio feedback control correction value for the injectors 18 for all of the cylinders 2 is calculated. At step S206, the deviation of air-fuel ratio feedback control correction value is increased by four times in consideration for the intake stroke split injection performed for only one out of the four cylinders 2 and the increased deviation of air-fuel ratio feedback control correction value is stored as a learning correction value for the injector 18 for the N-th cylinder 2. Subsequently, after changing the count N of the cylinder number counter by an increment of 1 (one) at step S207, a judgment is made at step S208 as to whether the count N is equal to the number of cylinders Nx, i.e. four in this embodiment. The flow chart logic repeats these steps S203 through S208 until the count N reaches the number of cylinders Nx, in other words, until a correction value has been learned for the injectors 10 for all of the cylinders 2. When the count N reaches the number of cylinders Nx, the flow chart logic orders return for another execution of the sequence routine.

According to the fuel injection quantity characteristic learning control shown in FIG. 8, even though there are individual differences in fuel injection quantity characteristic among the injectors 18, the learning correction value is attained with high accuracy according to fuel injection quantity characteristic for a fuel injection quantity zone peculiar to the individual injector 18. The learning correction value for an individual injector 18 may be determined through steps S7 through S8 according to an air-fuel ratio feedback control correction value for the injector 18 which is calculated based on output from an oxygen ($O_2$) sensor disposed in each of exhaust lines for groups of cylinders 2 whose intake strokes do not follow one after another.

Figure 9:
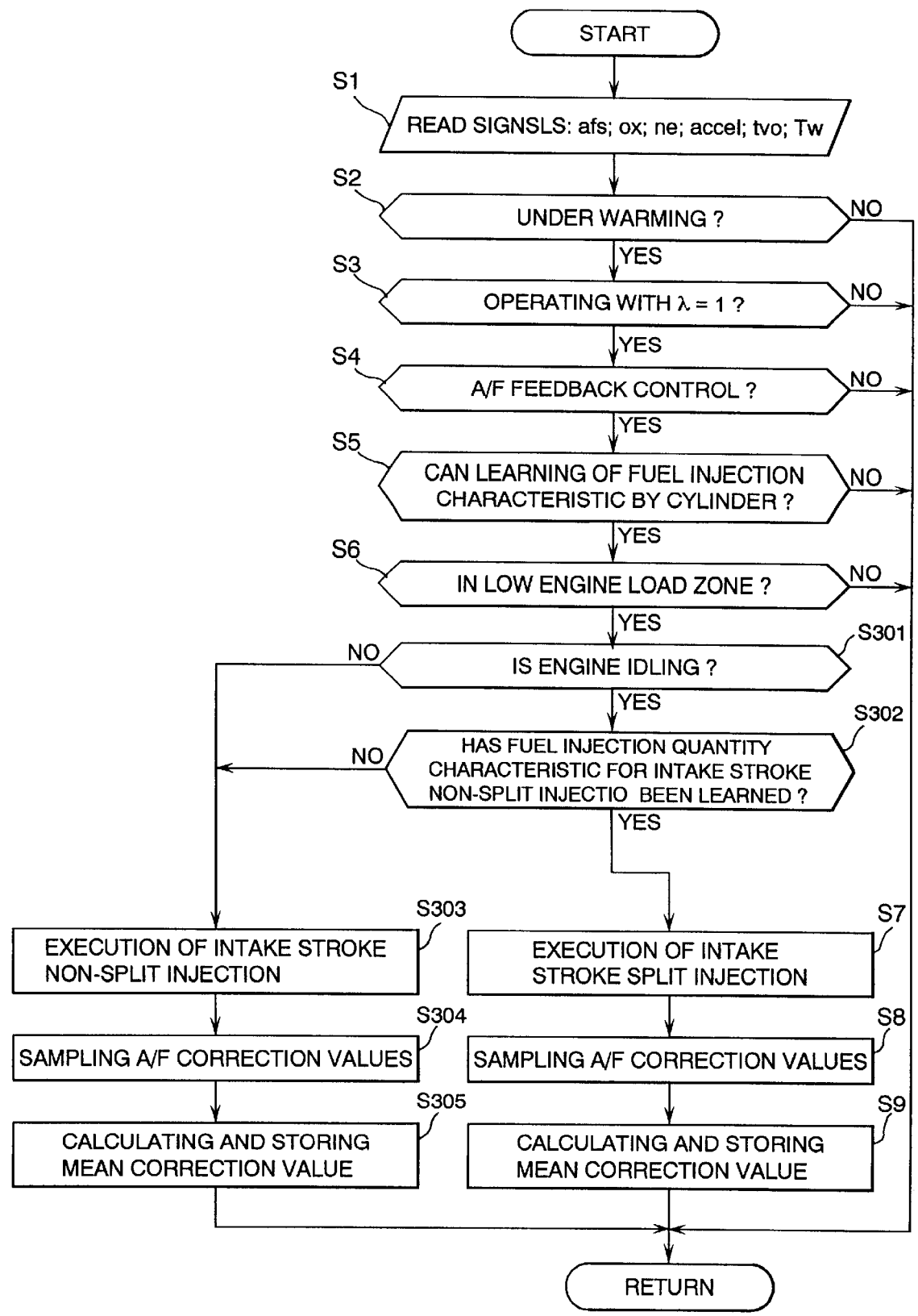
FIG. 9 is a flow chart illustrating a variation of the sequential routine of fuel injection quantity characteristic control shown in FIG. 6 for the microcomputer of the engine control unit.
Figure 10:
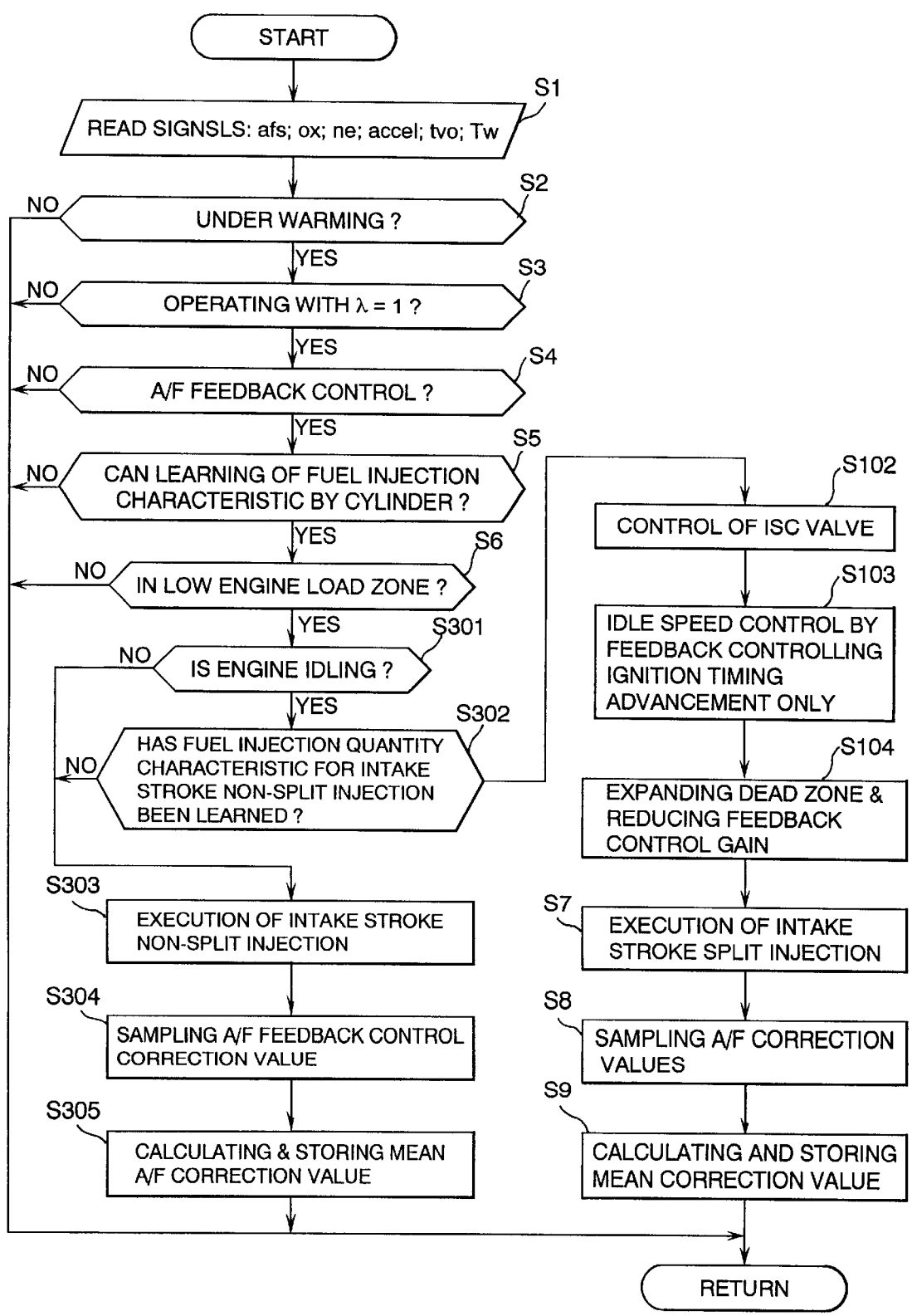
FIG. 10 is a flow chart illustrating a variation of the sequential routine of fuel injection quantity characteristic control shown in FIG. 7 for the microcomputer of the engine control unit.
Figure 11A:
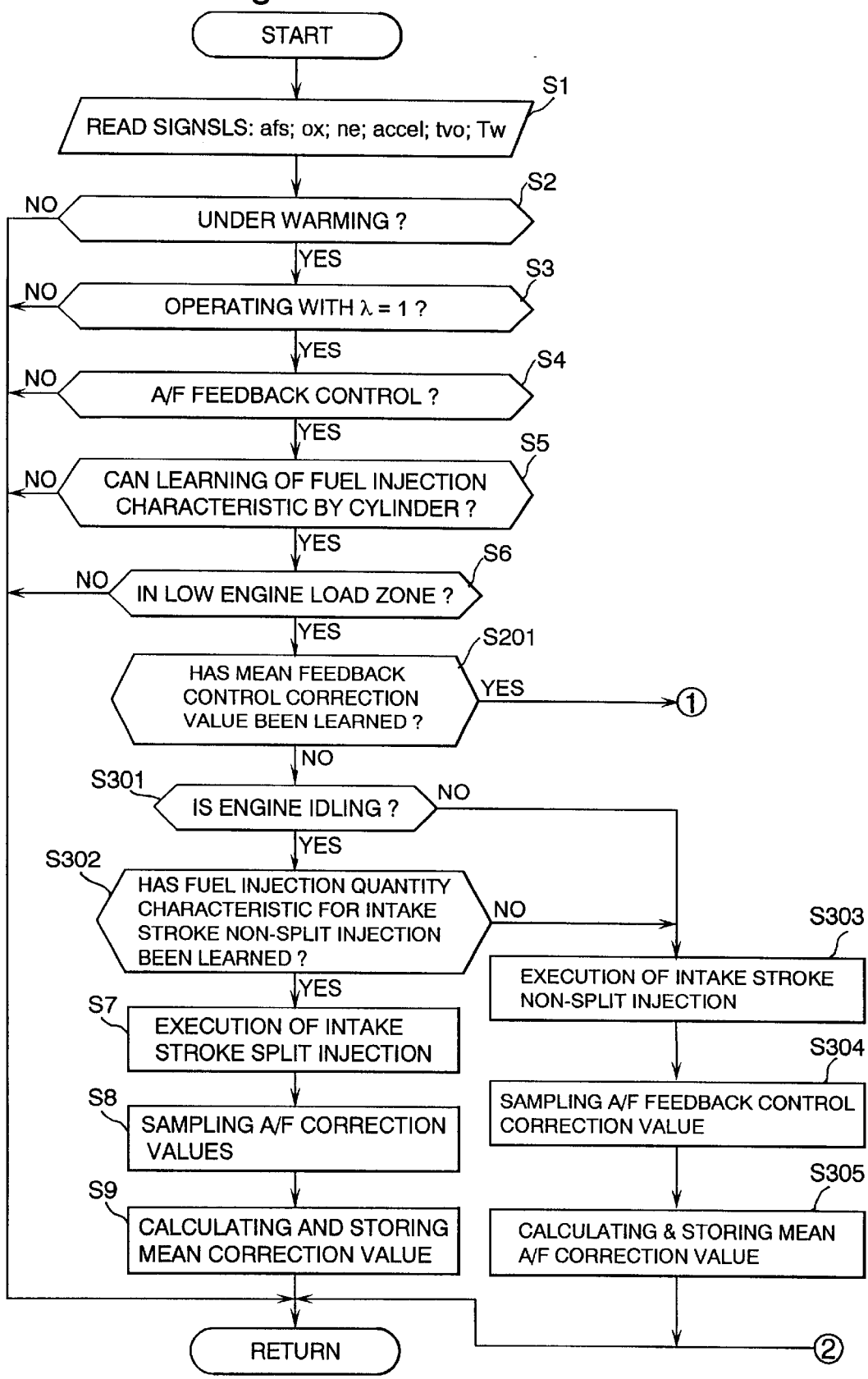
FIGS. 11A and 11B are a flow chart illustrating a variation of the sequential routine of fuel injection quantity characteristic control for the microcomputer of the engine control unit.
Figure 11B:
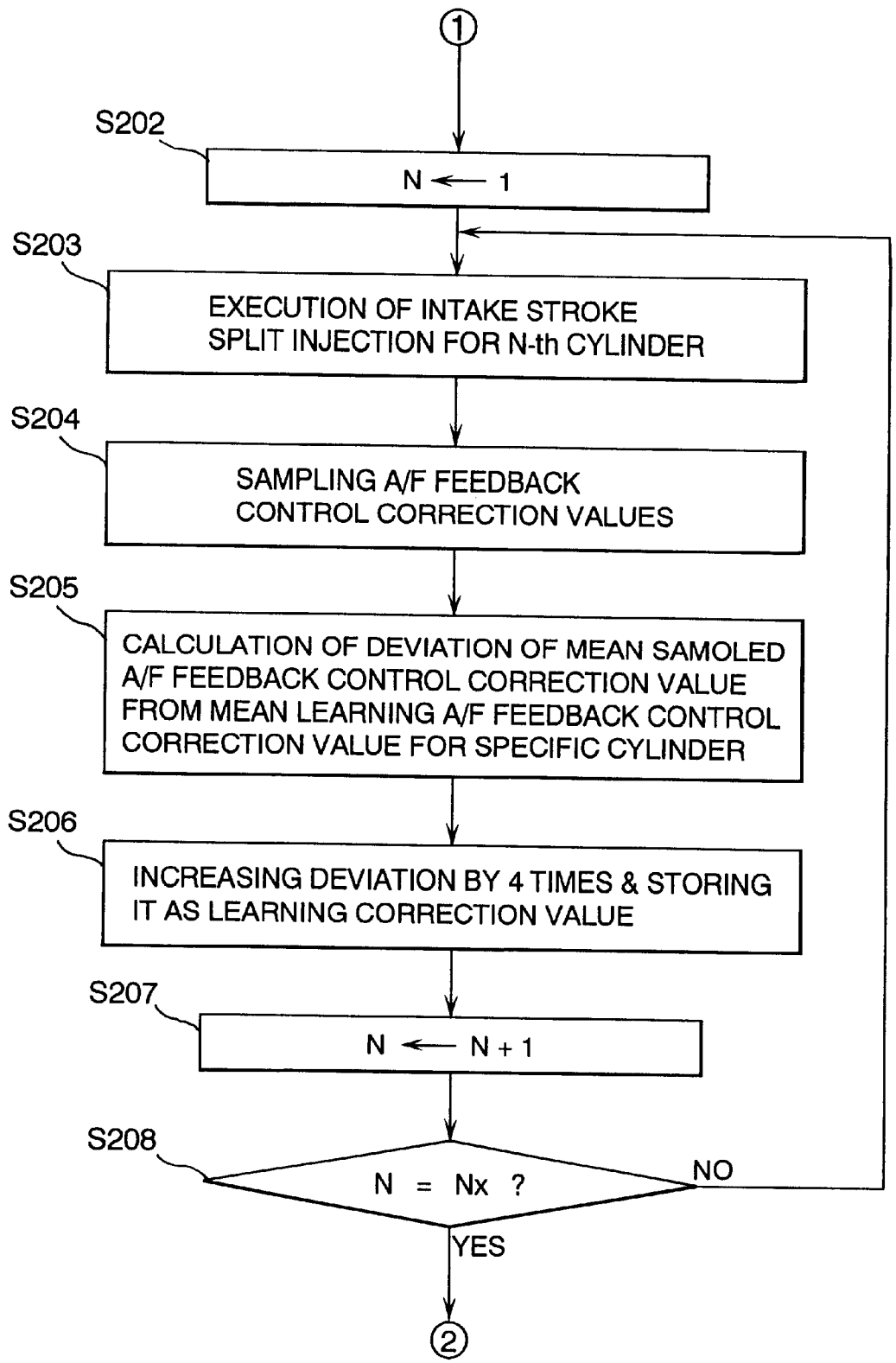

Learning of fuel injection quantity characteristic may be performed for each of the fuel injection quantity zones (a) and (b) for intake stroke non-split injection and split injection as shown in FIGS. 9 through 11 illustrating sequence routines of fuel injection quantity characteristic learning control including determining of fuel injection quantity characteristic for intake stroke non-split injection in addition to the sequence routine of fuel injection quantity characteristic learning control for split injection shown in FIGS. 6 through 8, respectively. In the sequence routine of fuel injection quantity characteristic learning control shown in each of FIGS. 9 through 11, determining of fuel injection quantity characteristic for intake stroke non-split injection and split injection are alternately performed during idling.

FIG. 9 is a flow chart illustrating another sequence routine of fuel injection quantity characteristic learning control during idling for the microcomputer of the engine control unit (PCM) 60. As shown, the flow chart logic commences and control proceeds directly to a function block at step S1 where signals are read in to monitor various control parameters including, at least, a quantity of intake air afs, an oxygen concentration of exhaust gas ox, an engine speed ne, an accelerator pedal travel accel, a throttle position tvo and an engine cooling water temperature Tw. Then, judgments are consecutively made at step S2 through S6. Specifically, at step S2, a judgment is made based on the engine cooling water temperature Tw as to whether the engine is under warming up. At step S3, a judgment is made based on the oxygen concentration of exhaust gas ox and throttle position tvo as to whether the engine is operated with a stoichiometric air-fuel ratio (which is represented by an air excess ratio $\lambda$ of 1). At step S4, a judgment is made as to whether the feedback control of air-fuel ratio (A/F-F/B control) is under execution. At step S5, a judgment is made as to whether the learning of fuel injection quantity characteristic can be executed. In this instance, the air-fuel ratio feedback control is executed while the engine cooling water is in a zone of temperatures for half-warmed engine operation. At step S6, a judgment is further made as to whether the engine load is in a zone of engine loads lower than a predetermined threshold value Ltvo for which the quantity of fuel injection is within the minute injection zone B shown in FIG. 12.

If any one of the answers to the judgments made at steps S2 through S6 is negative, the flow chart logic orders return for another execution of the sequence routine. When all of the answers to the judgments made at steps S2 through S6 are affirmative, a judgment is made at step S301 as to whether the engine is idling. When the engine is idling, a judgment is made at step S302 as to whether determination of fuel injection quantity characteristic for intake stroke non-split injection has been made in the last execution of the sequence routine. When the answer to the judgment is affirmative, then a learning correction value is determined through steps S7 through S9. At step S7, intake stroke split injection is performed with a split ratio of 1:1. Subsequently, a specified number of the air-fuel ratio feedback control correction values are sampled at step S8 and a mean value of the sampled air-fuel ratio feedback control correction values is calculated as a coefficient and stored as a learning correction value for a fuel injection quantity zone in which the respective intake stroke split injection are performed at step S9. The flow chart logic orders return for another execution of the sequence routine.

On the other hand, when the answer to at least either one of the judgments made at steps S301 and S302 is negative, intake stroke non-split injection is performed with an injection pulse width, which is determined based on a feedback control correction value (Cfb) and a basic quantity of fuel injection is converted at step S303. Subsequently, a specified number of the air-fuel ratio feedback control correction values are sampled at step S8, and a mean value of the sampled air-fuel ratio feedback control correction values is calculated and stored as a learning correction value for a fuel injection quantity zone in which the intake stroke non-split injection is performed at step S9. Thereafter, the flow chart logic orders return for another execution of the sequence routine.

FIG. 10 is a flow chart illustrating a variation of the sequence routine of fuel injection quantity characteristic learning control during idling for the microcomputer of the engine control unit (PCM) 60. As shown, if any one of the answers to the judgments made at steps S2 through S6 is negative, the flow chart logic orders return for another execution of the sequence routine. On the other hand, when all of the answers to the judgments made at steps S2 through S6 are affirmative, a judgment is made at step S301 as to whether the engine is idling. When the engine is idling, a judgment is made at step S302 as to whether learning of fuel injection quantity characteristic for intake stroke non-split injection has been made in the last execution of the sequence routine. When the answer to the judgment is affirmative, the idle speed control (ISC) valve 51 is controlled to maintain an opening balancing a quantity of intake air which is assumed for a maximum external engine load during idling at step S102, and the idling speed is controlled through feedback control of advancement of an ignition timing only at step S103. Subsequently, after extending a dead zone for idle speed feedback control in which a change in idle speed is allowed) and reducing a feedback control gain at step S104, a learning correction value for intake stroke split injection is determined through steps S7 through S9. At step S7, intake stroke split injection is performed with a split ratio of 1:1, and a specified number of the air-fuel ratio feedback control correction values are sampled at step S8. After calculating and storing a mean value of the sampled air-fuel ratio feedback control correction values as a learning correction value at step S9, the flow chart logic orders return for another execution of the sequence routine.

On the other hand, when the answer to at least either one of the judgments made at steps S301 and S302 is negative, intake stroke non-split injection is performed with an injection pulse width which is determined based on a feedback control correction value (Cfb) and a basic quantity of fuel injection is converted at step S303. Subsequently, a specified number of the air-fuel ratio feedback control correction values are sampled at step S304. After calculating and storing a mean value of the sampled air-fuel ratio feedback control correction values as a learning correction value at step S305, the flow chart logic orders return for another execution of the sequence routine.

FIG. 11 is a flow chart illustrating another variation of the sequence routine of the fuel injection quantity characteristic learning control. If any one of the answers to the judgments made at steps St. Through S6 is negative, the flow chart logic orders return for another execution of the sequence routine. On the other hand, when all of the answers to the judgments made at steps S2 through S6 are affirmative, a judgment is made at step S21 as to whether a mean value of feedback control correction values has been learned for all of the cylinders 2 in the present fuel injection quantity zone. When the answer to the judgment at step S21 is affirmative, after changing the count N of a cylinder number counter to 1 (one) at step S202, the intake stroke split injection is performed with a split ratio of 1:1 through the injector 18 for an N-th cylinder 2 at step S203, and a specified number of air-fuel ratio feedback control correction values are sampled at step S204. Subsequently, at step S205, a mean value of the sampled air-fuel ratio feedback control correction values is calculated and a deviation of the mean air-fuel ratio feedback control correction value for the injector 18 for the N-th cylinder 2 from the mean air-fuel ratio feedback control correction value for the injectors 18 for all of the cylinders 2 is calculated. At step S206, the deviation of air-fuel ratio feedback control correction value is increased by four times in consideration for the intake stroke split injection performed for only one out of the four cylinders 2 and the increased deviation of air-fuel ratio feedback control correction value is stored as a learning correction value for the injector 18 for the N-th cylinder 2. Subsequently, after changing the count N of the cylinder number counter by an increment of 1 (one) at step S207, a judgment is made at step S208 as to whether the count N indicates a specified value Nx which is equal to the number of cylinders Nx, i.e. four in this embodiment. The flow chart logic repeats these steps S203 through S208 until the count N indicates the specified value Nx. When the count N reaches the specified value Nx, the flow chart logic orders return for another execution of the sequence routine.

On the other hand, when the answer to the judgment made at step S21, a judgment is made at step S301 as to whether the engine is idling. When the engine is idling, a judgment is made at step S302 as to whether determination of fuel injection quantity characteristic for intake stroke non-split injection has been made in the last execution of the sequence routine. When the answer to the judgment is affirmative, then a learning correction value is determined through steps S7 through S9. At step S7, intake stroke split injection is performed with a split ratio of 1:1. Subsequently, a specified number of the air-fuel ratio feedback control correction values are sampled at step S8 and a mean value of the sampled air-fuel ratio feedback control correction values is calculated as a coefficient and stored as a learning correction value for a fuel injection quantity zone in which the respective intake stroke split injection are performed at step S9. The flow chart logic orders return for another execution of the sequence routine. On the other hand, when the answer to at least either one of the judgments made at steps S301 and S302 is negative, intake stroke non-split injection is performed with an injection pulse width, which is determined based on a feedback control correction value (Cfb) and a basic quantity of fuel injection at step S303. Subsequently, a specified number of the air-fuel ratio feedback control correction values are sampled at step S8, and a mean value of the sampled air-fuel ratio feedback control correction values is calculated and stored as a learning correction value for a fuel injection quantity zone in which the intake stroke non-split injection is performed at step S9. Thereafter, the flow chart logic orders return for another execution of the sequence routine.

FIG. 14 shows a variation of the engine control unit (PCM) 60 shown in FIG. 4. The engine control unit (PCM) 60 has functional means 91 and 92 in addition to the functional means 80 through 85 of that shown in FIG. 4. A basic ignition timing is determined in the functional means 91 and properly regulated according to an engine speed ne in the functional means 92. An ignition timing control signal k is directed to the ignition coil 16. In this embodiment, after the engine has been warmed up, stratified charge combustion control is performed with a lean fuel mixture in a zone of lower engine loads. On the other hand, while the engine is in a half-warmed state, homogeneous charge combustion control is performed with a stoichiometric fuel mixture together with fuel injection feedback control based on output from an oxygen ($O_2$) sensor 57 disposed in an exhaust line 41. Further, under specified engine operating conditions, intake stroke split injection control and fuel injection quantity characteristic learning control in the minute injection zone B are performed based on a feedback correction value. During execution of the fuel injection quantity characteristic learning control in a zone of no-engine load and lower engine speeds such as an idling zone, the quantity of intake air and the basic quantity of fuel injection according to the quantity of intake air have been adjusted so that an injection pulse width for single intake stroke split injection is approximately equal to a minimum injection pulse width for single injection during lean stratified charge combustion. That is, when intake stroke split injection is performed in order to determine a fuel injection quantity characteristic in the zone of no-engine load and lower engine speeds such as an idling zone, a control parameter of the idle speed control (ISC) valve 51 is controlled to maintain a specified quantity of intake air greater than a quantity of intake air during ordinary engine operation in the zone of no-engine load and lower engine speeds such as an idling zone and a split injection pulse width which is half an injection pulse width for the quantity of fuel injection corresponding to the quantity of intake air, is made approximately equal to the minimum injection pulse width for fuel injection during lean stratified charge combustion. In order to maintain a lower engine speed by controlling an increase in engine speed resulting from adjustment of the quantity of intake air and the basic quantity of fuel injection while intake stroke split injection is performed in order to determine a fuel injection quantity characteristic in the zone of no-engine load and lower engine speeds such as an idling zone, the engine control unit (PCM) 60 has functional means, i.e., the ignition timing regulating means 92, which retards basic ignition timing determined in the basic ignition timing determining means 91 to control an increase in engine speed. The ignition timing regulating means 92 is further adapted to determine an engine speed feedback correction value with which an idle speed is feedback controlled during performing intake stroke split injection in order to determine a fuel injection quantity characteristic in the zone of no-engine load and lower engine speeds, such as an idling zone.

Further, in this embodiment, during execution of air-fuel ratio feedback control, after performing overall of fuel injection quantity characteristic in which a learning correction value is determined based on a mean value of controlled values for all of the cylinders 2 and reflected on the quantity of fuel injection for each cylinder 2, the determining of fuel injection quantity characteristic is performed by cylinder. For the determining of fuel injection quantity characteristic for a specific cylinder 2, an air-fuel ratio is detected based on output from an oxygen ($O_2$) sensor disposed at or after an exhaust manifold at a specified timing corresponding to a time at which an exhaust gas from the specific cylinder 2 passes the oxygen ($O_2$) sensor. A fuel injection quantity for the specific cylinder 2 is feedback controlled according to the air-fuel ratio and a learning correction value for the specific cylinder 2 is determined based on the feedback controlled value. As efficacious control, in this embodiment, is the deviation of output from the oxygen ($O_2$) sensor from output an corresponding to a stoichiometric air-fuel ratio from the oxygen ($O_2$) sensor. The determining of fuel injection quantity characteristic by cylinder is executed in order of amplitude of the deviations for the respective cylinders 2. A learning correction value is determined by cylinder based on the quantity of fuel injection feedback controlled according to the output from the oxygen ($O_2$) sensor in that order. The fuel injection quantity characteristic learning control is accomplished following a sequence routine illustrated by a flow chart shown in FIGS. 15 through 18.

Referring to FIGS. 15 through 18, the flow chart logic commences and control proceeds directly to a function block at step S401 where signals are read in to monitor various control parameters including at least an air flow rate afs, an oxygen concentration of exhaust gas ox, an engine speed ne, an accelerator pedal travel accel, a throttle position tvo and an engine cooling water temperature Tw. Then, a judgment is made at step S402 as to whether determining of fuel injection quantity characteristic can be accomplished. In this instance, determining the fuel injection quantity characteristic is permitted on condition that the engine is being warmed and operates with a stoichiometric air-fuel ratio in a zone of lower engine loads, such as an idling zone, in an ordinary operating state and the air-fuel ratio feedback control is in operation. When the determining of fuel injection quantity characteristic can be accomplished, a judgment is made at step S403 as to whether overall determining of fuel injection quantity characteristic has been completed. Subsequently, a judgment is made as to whether the overall determining of fuel injection quantity characteristic can be executed at step S410 before completion of the overall determining of fuel injection quantity characteristic or whether the learning of fuel injection quantity characteristic by cylinder can be executed at step S430 after completion of the overall learning of fuel injection quantity characteristic. If the answer to any one of the judgments made at step S402, S410 and S430 is negative, the flow chart logic orders return for another execution of the sequence routine.

When the overall determining of fuel injection quantity characteristic can be accomplished, after determining a fuel injection feedback correction value according to output from the oxygen ($O_2$) sensor 57 at step S411, a judgment is made at stem S412 as to whether determining of fuel injection quantity characteristic in the minute injection zone B has not yet been completed. Before completion of the determining of fuel injection quantity characteristic in the minute injection zone B, a split injection pulse width is determined at step S413. Specifically, an injection pulse width is determined correspondingly to a quantity of fuel injection which is determined based on the feedback correction value and a basic quantity of fuel injection determined based on a quantity of intake air and an engine speed and divided into two parts with a split ratio of, for example, 1:1. In this instance, as was described, in the zone of lower engine loads, such as an idling zone, in which an injection pulse width corresponding to a half of the quantity of fuel injection is smaller than a minimum injection pulse width during lean stratified charge combustion, the quantity of intake air and the quantity of fuel injection are adjusted to be greater than usual so as to make the split injection pulse width equal to or greater than the minimum injection pulse width during lean stratified charge combustion. Subsequently, at step S414, in order to control an increase in engine speed, which is caused following increases in both intake air quantity and fuel injection quantity, by retarding an ignition timing, a retarding value for ignition timing is determined according to these increases.

At step S415, a judgment is made as to whether the engine is idling. When the engine is idling, at step S416, an idle speed feedback correction value is determined so as to perform the engine speed feedback control by means of ignition timing control in a state that the quantity of intake are is adjusted as described above and fixed. After determination of the idle speed feedback correction value at step S416 or when it is judged that the engine is not idling at step S415, while an intake stroke split injection is performed with the split injection pulse widths determined at step S413, the fuel injection feedback control based on the fuel injection feedback correction value and the ignition timing control based on the basic ignition timing, the ignition timing retarding value and the idle speed feedback correction value are determined at step S417. Thereafter, a judgment is made st step S418 as to whether the cylinder number counter shows a count N greater than the specified value Nx. When the count N is less than the specified value Nx, after integrating the quantities of fuel injection and the feedback correction values, respectively, at step S419 and changing the counter N by an increment of 1 (one) at step S420, the flow chart logic orders return for another execution of the sequence routine. On the other hand, when the count N is greater than the specified value Nx, after calculating mean values by dividing the integrated fuel injection quantity and the integrated feedback correction value by the count N, respectively, at step S421, a judgment is made at step S422 as to whether the mean feedback correction value is within a permissible extent. If the mean feedback correction value is too large to fall within the permissible extent, which is caused due for example to an error of detection of an air-fuel ratio by the oxygen ($O_2$) sensor 57 and heavy shouldering of the injector 18, conditions are assumed to be improper for the learning of fuel injection quantity characteristic. Therefore, when the mean feedback correction value is out of the permissible extent at step S422, after resetting the integrated fuel injection quantity, the integrated feedback correction value and the count N to their initial values, respectively, at step S423, the flow chart logic orders return for another execution of the sequence routine. When the mean feedback correction value is small sufficiently to fall within the permissible extent at step S422, after storing the mean integrated fuel injection quantity and the mean integrated feedback correction value as values in a fuel injection rate table so as to be reflected in the subsequent control at step S424, a judgment is made at step S425 as to whether the determining of fuel injection quantity characteristic has been completed for a specified number of points in each of the normal and minute injection zones A and B. When the answer is negative, then, the flow chart logic orders return for another execution of the sequence routine.

When the answer to the judgment made at step S212 is affirmative, this indicates that the determining of fuel injection quantity characteristic in the minute injection zone B has been completed, then, an injection pulse width is determined at step S426. In this instance, in order to perform the of fuel injection quantity characteristic in the normal injection zone A, a quantity of fuel injection for intake stroke non-split injection is determined. Specifically, an injection pulse width is determined correspondingly to a quantity of fuel injection which is determined based on the feedback correction value and a basic quantity of fuel injection determined based on a quantity of intake air and an engine speed. Thereafter, the flow chart logic proceeds to steps S415 through S425. As long as the mean feedback correction value is within the permissible extent, the mean integrated fuel injection quantity and the mean integrated feedback correction value are stored as values in the fuel injection rate table so as to be reflected in the subsequent control. As the result of repeating the above steps, when the answer to the judgment made at step S425 becomes affirmative, this indicates that the determining of fuel injection quantity characteristic has been completed for all points in the normal and minute injection zones A and B, then, the overall determining of fuel injection quantity characteristic is completed at step S427 and the flow chart logic orders return for another execution of the sequence routine.

When the answer to the judgment made at step S430 is affirmative, this indicates that the determining of fuel injection quantity characteristic by cylinder can be executed, then, a judgment is made at step S431 as to whether an order of cylinders 2 has been established, in other words, whether order flag assignment has been made. When the order of cylinders 2 has not yet been established, i.e. when the order flag assignment has not yet been made or order flags have been down, a deviation of output (which takes a value between 0V and 1V) provided at a specified timing by an oxygen ($O_2$) sensor representative of an air-fuel ratio from output (which takes 0.55V as a standard value for reversal between rich and lean fuel mixtures) from an oxygen ($O_2$) sensor representative of a stoichiometric air-fuel ratio is determined at step S432, and then, order flags F(1) to F(4) are assigned to the cylinders 2 in order of amplitude of the deviations for the respective cylinders 2 at step S433. Subsequently, after taking the order flag F(N) (where N is 1) as a learning execution flag F(N) indicating a specific cylinder 2 for which the determining of fuel injection quantity characteristic is performed at step S434, a judgment is made at step S435 as to whether the determining of fuel injection quantity characteristic in the minute injection zone B has not yet been completed. Before completion of the determining of fuel injection quantity characteristic in the minute injection zone B, i.e. when the answer to the judgment made at step S435 is affirmative, the determining of fuel injection quantity characteristic by cylinder is performed through steps S436 to S452. On the other hand, after completion of the determination of fuel injection quantity characteristic in the minute injection zone B, i.e. when the answer to the judgment made at step S435 is negative, the determining of fuel injection quantity characteristic by cylinder is performed through steps S439 to S452 after determining a non-split injection pulse width at step S453. These steps for the determining of fuel injection quantity characteristic by cylinder are repeated until it is judged at step S452 that the determining of fuel injection quantity characteristic has been completed for a specified number of points in each of the normal and minute injection zones A and B.

When the answer to the judgment made at step S435 is affirmative, this indicates that the determining of fuel injection quantity characteristic in the minute injection zone B has not yet been completed, then, a basic split injection pulse width is determined at step S436. Specifically, a basic injection pulse width determined based on a quantity of intake air and an engine speed under the condition that the quantity of intake air is adjusted so as to make the split injection pulse width equal to or greater than the minimum injection pulse width during lean stratified charge combustion is divided into two basic split injection pulse widths for intake stroke split injection. An eventual spilt injection pulse width is determined at step S437. In this instance, the eventual split injection pulse width for a specific cylinder 2 for which the learning execution flag F(N) is up is determined based on the basic split injection pulse width, a feedback correction value determined based on output provided at a specified timing by the oxygen ($O_2$) sensor for the specific cylinder 2 and the feedback correction learning value gained through the overall determining of fuel injection quantity characteristic. The eventual split injection pulse width for each of the remaining cylinders 2 is determined based on the basic split injection pulse width and the feedback correction learning value gained through the overall determining of fuel injection quantity characteristic. In the event where a feedback correction learning value for a cylinder 2 has been gained, the eventual split injection pulse width for the cylinder 2 is determined in consideration with the feedback correction learning value by cylinder as well as the basic split injection pulse width and the feedback correction learning value gained through the overall learning of fuel injection quantity characteristic. Subsequently, after determining a retarding value for ignition timing according to increases in intake air quantity and fuel injection quantity at step S438.

Thereafter, a judgment is made at step S439 as to whether the engine is idling. When the engine is idling, at step S439, an idle speed feedback correction value is determined so as to perform the engine speed feedback control by means of ignition timing control in a state that the quantity of intake is adjusted as described above and fixed. After determination of the idle speed feedback correction value at step S440 or when it is judged that the engine is not idling at step S439, while an intake stroke split injection is performed with the eventual split injection pulse widths determined at step S437, the fuel injection feedback control based on the fuel injection feedback correction value and the ignition timing control based on the basic ignition timing, the ignition timing retarding value the idle speed feedback correction value are accomplished at step S441. Thereafter, a judgment is made st step S442 as to whether the cylinder number counter shows a count N greater than the specified value Nx. When the count N is less than the specified value Nx, after integrating the quantities of fuel injection and the feedback correction values, respectively, for the cylinder 2 for which the learning execution flag F(N) is up at step S443 and changing the counter N by an increment of 1 (one) at step S444, the flow chart logic orders return for another execution of the sequence routine. On the other hand, when the count N is greater than the specified value Nx, after calculating mean values by dividing the integrated fuel injection quantity and the integrated feedback correction value, for the cylinder 2 for which the learning execution flag F(N) is up, by the count N, respectively, at step S445, a judgment is made at step S446 as to whether the mean feedback correction value is within the permissible extent. When the mean feedback correction value is out of the permissible extent at step S446, after resetting the integrated fuel injection quantity, the integrated feedback correction value and the count N to their initial values, respectively, at step S447, the flow chart logic orders return for another execution of the sequence routine. When the mean feedback correction value is sufficiently small to fall within the permissible extent at step S446, after storing the mean integrated fuel injection quantity and the mean integrated feedback correction value as values in a fuel injection rate table so as to be reflected in the subsequent control at step S448, the order flag F(N+1) is taken as a learning execution flag F(N) at step S449. When the number of order N is greater than the specified value Nx at step S450, this indicates that the determining of fuel injection quantity characteristic has been completed for all of the cylinders 2, then, the flow chart logic orders return for another execution of the sequence routine. On the other hand, when the number of order N is less than the specified value Nx at step S450, after resetting down all of the order flags F(N) at step S451, a judgment is made at step S452 as to whether the determining of fuel injection quantity characteristic by cylinder has been completed for a specified number of points in each of the normal and minute injection zones A and B. When the answer is negative, or after completing the determining of fuel injection quantity characteristic by cylinder at step S454 when the answer has become affirmative, the flow chart logic orders return for another execution of the sequence routine.

According to the fuel injection quantity learning control illustrated by the flow chart shown in FIGS. 15 through 18, the learning correction value near a minimum injection pulse width during engine operation with lean stratified charge combustion (an injection pulse width during idling) is accurately determined. Specifically, when the learning correction value for the minute injection characteristic zone B is determined by performing intake stroke split injection during execution of the fuel injection feedback control based on output from the oxygen ($O_2$) sensor to try to maintain a stoichiometric air-fuel ratio, since, while the quantity of fuel injection increases due to thermal efficiency during an ordinary idling state inferior to during engine operation with lean stratified charge combustion, nevertheless, it is not doubled, a split injection pulse width becomes smaller that the minimum injection pulse width during engine operation with lean stratified charge combustion when dividing an injection pulse width corresponding to the quantity of fuel injection into two parts. Therefore, in this embodiment, in the event where intake stroke split injection is performed during execution of the fuel injection feedback control based on output from the oxygen ($O_2$) sensor, the quantity of intake air and the basic quantity of fuel injection according to the quantity of intake air are set to be greater than those during idling so that a split injection pulse width is made as large as a minimum injection pulse width during engine operation with lean stratified charge combustion. Accordingly, a learning correction value near the minimum injection pulse width during engine operation with lean stratified charge combustion (an injection pulse width during idling) is accurately determined. However, if the quantity of intake air and the basic quantity of fuel injection according to the quantity of intake air are simply set to be greater than those during ordinary idling, there occurs such inexpediency that an excessive rise in idle speed gives the driver an unpleasant feeling or that the vehicle unnecessarily creeps during idling in the drive range when the vehicle is equipped with an automatic transmission. For this reason, in this embodiment, a rise in engine speed due to an increase in the quantities of intake air and fuel injection is controlled by properly retarding an ignition timing in such a state, so as to eliminate the inexpediency.

Execution of the determination of fuel injection quantity characteristic by cylinder through steps S431 to S451 in addition to the overall determination of fuel injection quantity characteristic through steps S411 to S427 increases the accuracy of determination and, even in the minute fuel quantity injection zone, the fuel injection quantity feedback control and fuel injection quantity determined by cylinder based on output from the oxygen ($O_2$) sensor are performed effectively. Specifically, when performing the determination of fuel injection quantity characteristic by cylinder, a detection of air-fuel ratio is made by cylinder by picking up output of the oxygen ($O_2$) sensor representing an air-fuel ratio at a specified timing which corresponds to a point of time at which an exhaust gas from a specific cylinder 2 passes the oxygen ($O_2$) sensor. Although the exhaust gas is hard to cause sufficient pulsations while the quantity of exhaust gas is small and, in consequence, there is a fear of an occurrence of error of air-fuel ratio due to stagnation of an exhaust gas from the preceding cylinder 2 around the oxygen ($O_2$) sensor when detecting an air-fuel ratio for the specific cylinder 2, because, in this embodiment, the quantity of intake air and the basic quantity of fuel injection are set to be greater than those during ordinary idling when split injection is performed in a zone of idling conditions, the quantity of exhaust gas is increased to make the output from the oxygen ($O_2$) sensor show a distinctive change which indicates a sharp change in air-fuel ratio, increasing the accuracy of air-fuel ratio control by cylinder. Further, in this embodiment, the determination of a value through the determining of fuel injection quantity characteristic by cylinder is performed first for a cylinder 2 discharging an exhaust gas for which the oxygen ($O_2$) sensor provides an output which most different from that representative of a stoichiometric air-fuel ratio and, after reflecting the value on the fuel injection control for the cylinder 2, the determination of a learning value through the determination of fuel injection quantity characteristic by cylinder is performed for another cylinder 2 discharging an exhaust gas for which the oxygen ($O_2$) sensor provides output which is secondmost different from that representative of the stoichiometric air-fuel ratio. Accordingly, although output from the oxygen ($O_2$) sensor is adversely effected by an exhaust gas discharged from a previous cylinder 2 and staying around the oxygen ($O_2$) sensor, the degree of adverse effect is significantly lowered with an effect of increasing the accuracy of air-fuel ratio detection by cylinder, and hence the accuracy of fuel injection feedback control by cylinder. As a result, the accuracy of air-fuel ratio control by cylinder is significantly improved in the event where the intake stroke split injection is made for of determining fuel injection quantity characteristic by cylinder for injection pulse widths close to a minimum pulse width in the minute injection zone B shown in FIG. 12 in which high accuracy is required. Since the learning correction value by cylinder is determined in this manner, even though there are differences in fuel injection quantity characteristic among the injectors 18 for the respective cylinders 2, a learning correction value for injectors 18 is accurately determined according to the fuel injection quantity characteristic in the minute injection zone B of the injector 18. Further, since the determining of fuel injection quantity characteristic by cylinder through steps S431 to S451 is executed under reflection of a mean learning correction value resulting from the overall determining of fuel injection quantity characteristic through steps S411 to S427, the learning accuracy is increased.

In this embodiment, the overall determination of fuel injection quantity characteristic may be repeatedly executed after execution of the determination of fuel injection quantity characteristic by cylinder. In this instance, since the learning correction value is modified even if there occurs a deviation of a mean learning correction value resulting from the of fuel injection quantity characteristic by cylinder, the learning accuracy is even more increased.

The quantity of fuel injection may be divided into more than three parts by split injection in an intake stroke. The λ oxygen ($O_2$) sensor may be replaced with a linear oxygen ($O_2$) sensor which provides output varying corresponding linearly to a change in air-fuel ratio, which makes it possible to perform air-fuel feedback control for trying to maintain a specified air-fuel ratio other than a stoichiometric air-fuel ratio. In this instance, because the linear oxygen ($O_2$) sensor decreases the accuracy of detecting an air-fuel ratio with an increase in deviation from the stoichiometric air-fuel ratio, it is preferred to perform the determination of fuel injection quantity characteristic during execution of the air-fuel feedback control aiming at the stoichiometric air-fuel ratio or an air-fuel ratio approximately equal to the stoichiometric air-fuel ratio.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A fuel injection control system, for a direct injection-spark ignition type of engine equipped with an injector operative to spray fuel directly into a combustion chamber of the engine, which determines an injection pulse width corresponding to a given quantity of fuel with which the injector is kept open to spray said quantity of fuel, controls the injector to spray fuel through a compression stroke while the engine operates with lower engine loads in an engine operating zone specified for lean stratified charge combustion so that the fuel is stratified around an ignition plug to cause lean stratified charge combustion to, thereby, provide an air-fuel ratio greater than a stoichiometric air-fuel ratio, said fuel injection control system comprising:

an oxygen sensor operative to monitor the oxygen content of an exhaust gas to detect an air-fuel ratio; and control means for executing fuel injection feedback control to control said quantity of fuel injection based on said air-fuel ratio detected by said oxygen sensor, causing the injector to spray fuel through a plurality of intake stroke split injections in a specified engine operating zone in which said fuel injection feedback control is performed to maintain at least an approximately stoichiometric air-fuel ratio while the engine operates with lower loads, determining a fuel injection quantity characteristic of the injector with respect to injection pulse width for each said intake stroke split injection based on a value controlled by the fuel injection feedback control during execution of the intake stroke split injection to determine a learning correction value, and making said learning correction value reflect on said control of the quantity of fuel in a minute injection quantity zone specified within said specified engine operating zone for said lean stratified charge combustion.

2. The fuel injection control system for a direct injection-spark ignition type of engine as defined in claim 1, wherein said fuel injection control system is of a type which controls the engine to operate in said lean stratified charge combustion mode while the engine is in a warmed state in which the engine has attained a first threshold engine temperature and controls the injector to spray fuel so as to maintain said stoichiometric air-fuel ratio while the engine is in a half-warmed state in which the engine has attained a second threshold engine temperature lower than said first threshold engine temperature, and said control means executes said fuel injection feedback control, said intake stroke split injection and said determining of a fuel injection quantity characteristic of said injector in said half-warmed state.

3. The fuel injection control system for a direct injection-spark ignition type of engine as defined in claim 1, wherein said control means divides said quantity of fuel injection into two equal parts with a split ratio of 1:1 for early and later intake stroke split injection.

4. The fuel injection control system for a direct injection-spark ignition type of engine as defined in claim 3, wherein said control means drives said injector to perform each said intake stroke split injection at such a timing that a middle point of time between said early and later intake stroke split injection is ahead of a middle point of an intake stroke.

5. The fuel injection control system for a direct injection-spark ignition type of engine as defined in claim 1, wherein, when said fuel injection feedback control is based on said air-fuel ratio detected by said oxygen sensor, said intake stroke split injection and said determining of a fuel injection quantity characteristic of said injector are executed in an engine operating zone of lower engine loads and speeds, said control means performs each said intake stroke split injection with said injection pulse width approximately equal to a minimum injection pulse width for said compression stroke injection during engine operation in said lean stratified charge combustion mode and controls said quantity of fuel injection to restrain an increase in engine speed so as to make engine speed remain low in said engine operating zone of lower engine loads and speeds.

6. The fuel injection control system for a direct injection-spark ignition type of engine as defined in claim 5, wherein, while said fuel injection feedback control is based on said air-fuel ratio detected by said oxygen sensor, said intake stroke split injection and said determining of a fuel injection quantity characteristic of said injector are accomplished in said engine operating zone of lower engine loads and speeds, said control means controls a quantity of intake air introduced into the engine so that said control means performs each said intake stroke split injection with said injection pulse width approximately equal to a minimum injection pulse width for said compression stroke injection during engine operation in said lean stratified charge combustion mode and controls said quantity of fuel injection to restrain an increase in engine speed so as to make engine speed remain low in said engine operating zone of lower engine loads and speeds.

7. The fuel injection control system for a direct injection-spark ignition type of engine as defined in claim 5, wherein said control means retards ignition timing to restrain said increase in engine speed.

8. The fuel injection control system for a direct injection-spark ignition type of engine as defmed in claim 1, and further comprising idle speed control means for controlling a quantity of intake air introduced into the engine to control engine speed during idling by feedback control and intake air control means for restraining a change in said quantity of intake air caused due to said feedback control of said engine speed during idling while executing said intake stroke split injection and said determining of a fuel injection quantity characteristic of said injector during idling.

9. The fuel injection control system for a direct injection-spark ignition type of engine as defined in claim 8, wherein said intake air control means controls ignition timing while permitting a quantity of intake air necessary for the engine operation with maximum external loads so as thereby to control said engine speed during idling.

10. The fuel injection control system for a direct injection-spark ignition type of engine as defined in claim 8, wherein said intake air control means extends a dead zone for said feedback control of said engine speed during idling in which a change in engine speed is allowed while accomplishing said intake stroke split injection and said determining of a fuel injection quantity characteristic of said injector.

11. The fuel injection control system for a direct injection-spark ignition type of engine as defined in claim 1, wherein said engine is of a type having multiple cylinders and said control means performs both said intake stroke split injection and said determining of a fuel injection quantity characteristic of said injector by cylinder, in sequence, while accomplishing said fuel injection feedback control.

12. The fuel injection control system for a direct injection-spark ignition type of engine as defined in claim 1, wherein said engine is of a type having a multiple cylinders equipped with an exhaust manifold in which or downstream from which said oxygen sensor is disposed, and said control means accomplishes said fuel injection feedback control for a specific one of said cylinders based on said air-fuel ratio detected by said oxygen sensor at a specified timing which corresponds to a point of time at which an exhaust gas from said specific cylinder passes said oxygen sensor and determines said correction value for said specific cylinder based on a controlled value by said fuel injection feedback control.

13. The fuel injection control system for a direct injection-spark ignition type of engine as defined in claim 12, wherein said control means performs overall determining of fuel injection quantity characteristic in which an average value of controlled values by said fuel injection feedback control for all of said cylinders is determined as an overall correction value and, subsequently, determining said correction value for a specific one of said cylinders based on a controlled value by said fuel injection feedback control for said specific cylinder after reflecting said overall learning correction value on said quantity of fuel injection for said specific cylinder.

14. The fuel injection control system for a direct injection-spark ignition type of engine as defined in claim 12, wherein said control means determines said correction values based on said controlled values by said fuel injection feedback control for all of said cylinders, respectively, in order of amplitude of deviations of output from said oxygen sensor for said cylinders from output from said oxygen sensor corresponding to said stoichiometric air-fuel ratio.

15. The fuel injection control system for a direct injection-spark ignition type of engine as defined in claim 1, wherein said control means accomplishing said determining of said fuel injection quantity characteristic of the injector for intake stroke non-split injection and said intake stroke split injection in the same fuel injection quantity zone.

* * * * *